United States Patent
Lee et al.

(10) Patent No.: US 10,306,610 B2
(45) Date of Patent: May 28, 2019

(54) METHOD FOR RECEIVING CONTROL INFORMATION IN WIRELESS COMMUNICATION SYSTEM AND APPARATUS THEREFOR

(71) Applicant: LG ELECTRONICS INC., Seoul (KR)

(72) Inventors: Seungmin Lee, Anyang-si (KR); Hanbyul Seo, Anyang-si (KR); Hakseong Kim, Anyang-si (KR); Inkwon Seo, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/433,209

(22) PCT Filed: Oct. 23, 2013

(86) PCT No.: PCT/KR2013/009472
§ 371 (c)(1),
(2) Date: Apr. 2, 2015

(87) PCT Pub. No.: WO2014/065584
PCT Pub. Date: May 1, 2014

(65) Prior Publication Data
US 2015/0271790 A1  Sep. 24, 2015

Related U.S. Application Data

(60) Provisional application No. 61/717,638, filed on Oct. 23, 2012, provisional application No. 61/721,485,
(Continued)

(51) Int. Cl.
*H04W 48/16* (2009.01)
*H04W 88/02* (2009.01)
(Continued)

(52) U.S. Cl.
CPC ......... *H04W 72/042* (2013.01); *H04W 48/16* (2013.01); *H04W 72/1268* (2013.01); *H04W 88/02* (2013.01)

(58) Field of Classification Search
CPC ... H04W 72/042; H04W 88/02; H04W 48/16; H04W 52/04; H04W 52/0222; H04L 5/0016; H04L 5/0023; H04L 5/0055
(Continued)

(56) References Cited

U.S. PATENT DOCUMENTS 8,537,766 B2 *  9/2013  Hu ................ H04L 5/0023
                                             370/329
8,730,903 B2 *  5/2014  Seo ............... H04B 7/155
                                             370/315
(Continued)

FOREIGN PATENT DOCUMENTS

CN      101897227 A   11/2010
WO   WO 2012/065727 A1   5/2012

OTHER PUBLICATIONS

Huawei et al., "Aggregation levels of ePDCCH for localized and distributed transmission", 3GPP TSG RAN WG1 Meeting #70, Agenda Item: 7.6.3, Qingdao, China, Aug. 13-17, 2012, 2 pages, R1-123121.
(Continued)

*Primary Examiner* — Julio R Perez
(74) *Attorney, Agent, or Firm* — Birch, Stewart, Kolasch & Birch, LLP

(57) ABSTRACT

The present invention relates to a method and an apparatus for a terminal for receiving control information in a wireless communication system. More specifically, the method comprises a step for monitoring an enhanced physical downlink control channel (EPDCCH) set comprised in an EPDCCH, wherein an aggregation level for monitoring the EPDCCH
(Continued)

set is determined according to the configuration regarding the EPDCCH set.

8 Claims, 8 Drawing Sheets

Related U.S. Application Data filed on Nov. 1, 2012, provisional application No. 61/725,471, filed on Nov. 12, 2012, provisional application No. 61/725,989, filed on Nov. 13, 2012, provisional application No. 61/726,505, filed on Nov. 14, 2012.

(51) Int. Cl.
*H04W 72/04* (2009.01)
*H04W 72/12* (2009.01)

(58) Field of Classification Search
USPC ..... 455/422.1, 434; 370/328, 311, 338, 329, 370/330
See application file for complete search history.

(56) References Cited

U.S. PATENT DOCUMENTS

| | | | | |
|---|---|---|---|---|
| 9,642,180 | B2* | 5/2017 | Chen | H04B 15/00 |
| 2009/0154607 | A1* | 6/2009 | Lindoff | H04L 1/0038 |
| | | | | 375/341 |
| 2010/0279628 | A1 | 11/2010 | Love et al. | |
| 2013/0064215 | A1* | 3/2013 | Gao | H04L 5/0016 |
| | | | | 370/330 |
| 2013/0182664 | A1* | 7/2013 | Chen | H04W 72/042 |
| | | | | 370/329 |
| 2013/0235819 | A1* | 9/2013 | Zhang | H04W 72/04 |
| | | | | 370/329 |
| 2013/0235821 | A1* | 9/2013 | Chen | H04W 72/0406 |
| | | | | 370/329 |
| 2013/0250880 | A1* | 9/2013 | Liao | H04W 72/042 |
| | | | | 370/329 |
| 2014/0050159 | A1* | 2/2014 | Frenne | H04W 72/042 |
| | | | | 370/329 |
| 2014/0056279 | A1* | 2/2014 | Chen | H04W 52/04 |
| | | | | 370/330 |
| 2014/0092830 | A1* | 4/2014 | Chen | H04W 72/042 |
| | | | | 370/329 |
| 2014/0153532 | A1* | 6/2014 | Nogami | H04L 5/00 |
| | | | | 370/329 |
| 2014/0192730 | A1* | 7/2014 | Seo | H04L 5/0053 |
| | | | | 370/329 |

OTHER PUBLICATIONS

Mediatek Inc., "eCCE Aggregation Level and Complexity Analysis", 3GPP TSG-RAN WG1 #70, Agenda Item: 7.6.3, Qingdao, China, Aug. 13-17, 2012, 6 pages, R1-123339.
Zte, "Consideration on UE monitoring set", 3GPP TSG RAN WG1 Meeting #68bis, Agenda Item: 7.6.3, Jeju, Korea, Mar. 26-30, 2012, 3 pages, R1-121054.
Zte, "Discussion on ePDCCH candidates design", 3GPP TSG RAN WG1 Meeting #69, Agenda Item: 7.6.4.3, Prague, Czech Republic, May 21-25, 2012, 4 pages, R1-122106.

\* cited by examiner

METHOD FOR RECEIVING CONTROL INFORMATION IN WIRELESS COMMUNICATION SYSTEM AND APPARATUS THEREFOR

CROSS REFERENCE TO RELATED APPLICATIONS

This application is the National Phase of PCT/KR2013/009472 filed on Oct. 23, 2013, which claims priority under 35 U.S.C. 119(e) to U.S. Provisional Application No. 61/717,638 filed on Oct. 23, 2012, U.S. Provisional Application No. 61/721,485 filed on Nov. 1, 2012, U.S. Provisional Application No. 61/725,471 filed on Nov. 12, 2012, U.S. Provisional Application No. 61/725,989 filed on Nov. 13, 2012, and U.S. Provisional Application No. 61/726,505 filed on Nov. 14, 2012, all of which are hereby expressly incorporated by reference into the present application.

TECHNICAL FIELD

The present invention relates to a wireless communication system, and more particularly, to a method and apparatus for receiving control information in a wireless communication system.

BACKGROUND ART

A $3^{rd}$ Generation Partnership Project Long Term Evolution (3GPP LTE) communication system will be described as an exemplary wireless communication system to which the present invention can be applied.

FIG. 1 is a schematic view illustrating an Evolved Universal Mobile Telecommunications System (E-UMTS) network configuration as an exemplary wireless communication system. E-UMTS is an evolution of the legacy UMTS. E-UMTS is under basic standardization in the 3GPP. In general, it can be said that E-UMTS is an LTE system. For details of the UMTS and E-UMTS technical specifications, refer to Release 7 and Release 8 in "$3^{rd}$ Generation Partnership Project; Technical Specification Group Radio Access Network".

Referring to FIG. 1, the E-UMTS system includes a User Equipment (UE), evolved Node Bs (eNode Bs or eNBs), and an Access Gateway (AG) which is located at an end of the network (E-UTRAN), connected to an external network. An eNode B can simultaneously transmit multiple data streams for broadcast service, multicast service and/or unicast service.

A single eNode B manages one or more cells. A cell is set to operate in one of the bandwidths of 1.44, 3, 5, 10, 15, and 20 Mhz and provides downlink or uplink transmission service to a plurality of UEs. Different cells may be set to provide different bandwidths. The eNode B controls data transmission and reception to and from a plurality of UEs. Regarding DownLink (DL) data, the eNode B signals information about a time/frequency area, coding scheme, data size, Hybrid Automatic Repeat and reQuest (HARQ) information, etc. for data transmission to a UE by DL scheduling information. Regarding UpLink (UL) data, the eNode B signals information about a time/frequency area, coding scheme, data size, Hybrid Automatic Repeat and reQuest (HARQ) information, etc. available to the UE by UL scheduling information. An interface for transmitting user traffic or control traffic may be used between eNode Bs. A Core Network (CN) may be configured with an AG and a network node for performing user registration of a UE. The AG manages the mobility of UEs on a Tracking Area (TA) basis. A TA is composed of a plurality of cells.

Although wireless communication technology has reached the developmental stage of LTE based on Wideband Code Division Multiple Access (WCDMA), demands and expectations of users and service providers are ever increasing. Considering that other radio access technologies are being developed, new technological evolutions are required to achieve future competitiveness. There exists a need for reduction of cost per bit, increase of service availability, flexible use of frequency bands, simplified structures and open interfaces, and appropriate power consumption of UEs.

DISCLOSURE

Technical Problem

An object of the present invention devised to solve the problem lies in a method and apparatus for receiving control information in a wireless communication system.

It is to be understood that both the foregoing general description and the following detailed description of the present invention are exemplary and explanatory and are intended to provide further explanation of the invention as claimed.

Technical Solution

The object of the present invention can be achieved by providing a method for receiving control information by a user equipment (UE) in a wireless communication system, the method including monitoring an enhanced physical downlink control channel (EPDCCH) set included in an EPDCCH, wherein an aggregation level for monitoring the EPDCCH set is determined according to setting associated with the EPDCCH set.

The setting associated with the EPDCCH set may include at least one of the number of physical resource block (PRB) pairs included in the EPDCCH set, a system bandwidth, and a downlink control information (DCI) format transmitted in the EPDCCH set. The aggregation level may be configured in proportion to the number of the PRB pairs included in the EPDCCH set or, when the DCI format transmitted in the EPDCCH set is a predefined DCI format, the aggregation level may be determined according to the number of the number of the PRB pairs included in the EPDCCH set. [11] The setting associated with the EPDCCH set may be received using a higher layer signal or a physical layer signal. [12] The setting associated with the EPDCCH set may be configured to use only an aggregation level candidate of a predetermined level or more for the EPDCCH set. [13] The setting associated with the EPDCCH set may include a ratio value of an uplink cell bandwidth and a downlink cell bandwidth, and the number of PRB pairs included in an EPDCCH set for transmission of a predefined DCI format. The uplink cell bandwidth may indicate one of an uplink cell associated with a downlink cell or an uplink cell for transmission of a response message to the EPDCCH. The aggregation level may be configured to determine whether aggregation level candidate configuration for a DCI format for scheduling of uplink data communication is applied as aggregation level candidate configuration for a DCI format transmitted on a downlink cell, according to a ratio value of an uplink cell bandwidth and a downlink cell bandwidth. The aggregation may be configured to determine whether aggregation level candidate configuration for a DCI format for scheduling of uplink data communication is applied as aggregation level candidate configuration for a DCI format transmitted on a downlink cell by comparing a ratio value of an uplink cell bandwidth and a downlink cell bandwidth with a predefined threshold value. [14] The setting associated with the EPDCCH set may be setting associated to reception of control information based on a predetermined EPDCCH set for fallback until reconfiguration of the EPDCCH set is completed. The setting associated to reception of control information based on a predetermined EPDCCH set for fallback may include one of preset search region configuration information for the EPDCCH set for fallback or information for reallocation of search region configuration information of the EPDCCH set to which a predefined reconfiguration operation is applied. [15] The setting associated with the EPDCCH set may be configured in such a way that the number of PRB pairs included in a first EPDCCH set for transmission of a distributed EPDCCH (D-EPDCCH) is greater or equal to the number of PRB pairs included in a second EPDCCH set for transmission of a localized EPDCCH (L-EPDCCH). [16] The setting associated with the EPDCCH set may be configured in such a way that an aggregation level of a first EPDCCH set for transmission of a D-EPDCCH is higher than an aggregation level of a second. EPDCCH set for transmission of an L-EPDCCH.

In another aspect of the present invention, provided herein is a a user equipment (UE) for receiving control information in a wireless communication system, the UE including a radio frequency (RF) unit, and a processor, wherein the processor is configured to monitor an enhanced physical downlink control channel (EPDCCH) set included in an EPDCCH, and an aggregation level for monitoring the EPDCCH set is determined according to setting associated with the EPDCCH set.

Advantageous Effects

According to the present invention, downlink control information of a user equipment (UE) can be effectively detected in a wireless communication system.

It will be appreciated by persons skilled in the art that that the effects that could be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

In the drawings.

BEST MODE

The following description of embodiments of the present invention may apply to various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. 3GPP LTE adopts OFDMA in downlink and adopts SC-FDMA in uplink. LTE-A (LTE-Advanced) is an evolved version of 3GPP LTE.

For clarity, the following description mainly concerns 3GPP LTE system or 3GPP LTE-A system, by which the technical idea of the present invention may be non-limited. Specific terminologies used in the following description are provided to help understand the present invention and the use of the terminologies can be modified to a different form within a scope of the technical idea of the present invention.

Figure 1:
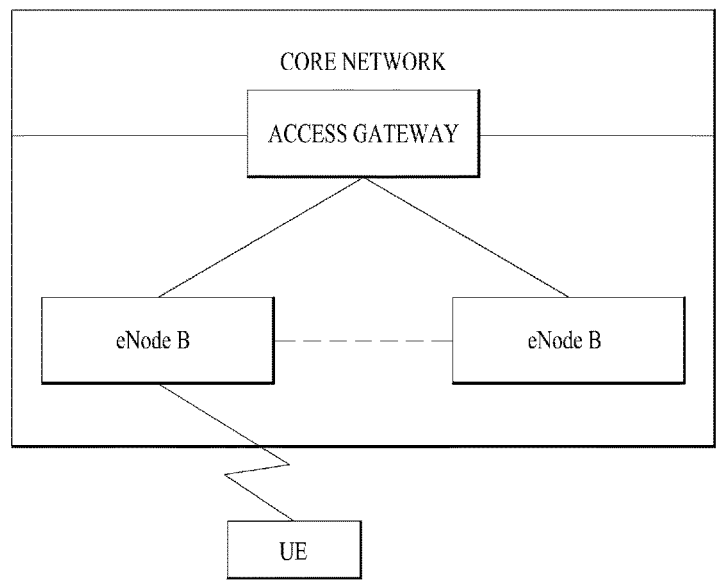
FIG. 1 is a schematic view illustrating an Evolved Universal Mobile Telecommunications System (E-UMTS) network configuration as an exemplary wireless communication system.
Figure 2:
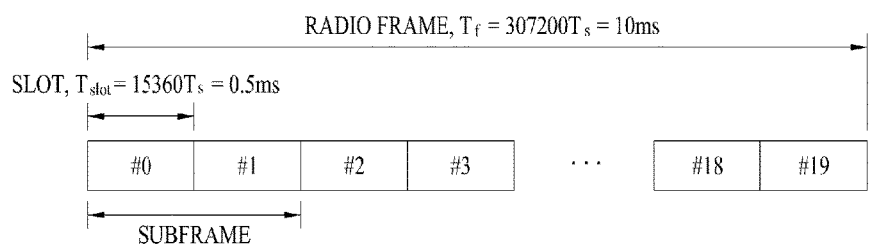
FIG. 2 is a diagram for an example of a radio frame structure of 3GPP system.

FIG. 2 is a diagram for an example of a radio frame structure of 3GPP system.

Referring to FIG. 2, A radio frame includes 10 subframes. Each of the subframes includes 2 slots in time domain. A time taken to transmit one subframe is defined as a transmission time interval (hereinafter abbreviated TTI). For instance, one subframe may have a length of 1 ms and one slot may have a length of 0.5 ms. One slot may include a plurality of OFDM symbols or SC-FDMA (single carrier frequency division multiple access) symbol in time domain. Since 3GPP LTE system uses OFDMA in downlink and SC-FDMA in uplink, OFDM or SC-FDMA symbol indicates one symbol period. Resource block (RB) is a resource allocation unit and may include a plurality of contiguous subcarriers in one slot. The above-described structures of the radio frame are exemplary only. And, the number of subframes included in a radio frame, the number of slots included in the subframe and the number of symbols included in the slot may be modified in various ways.

Figure 3:
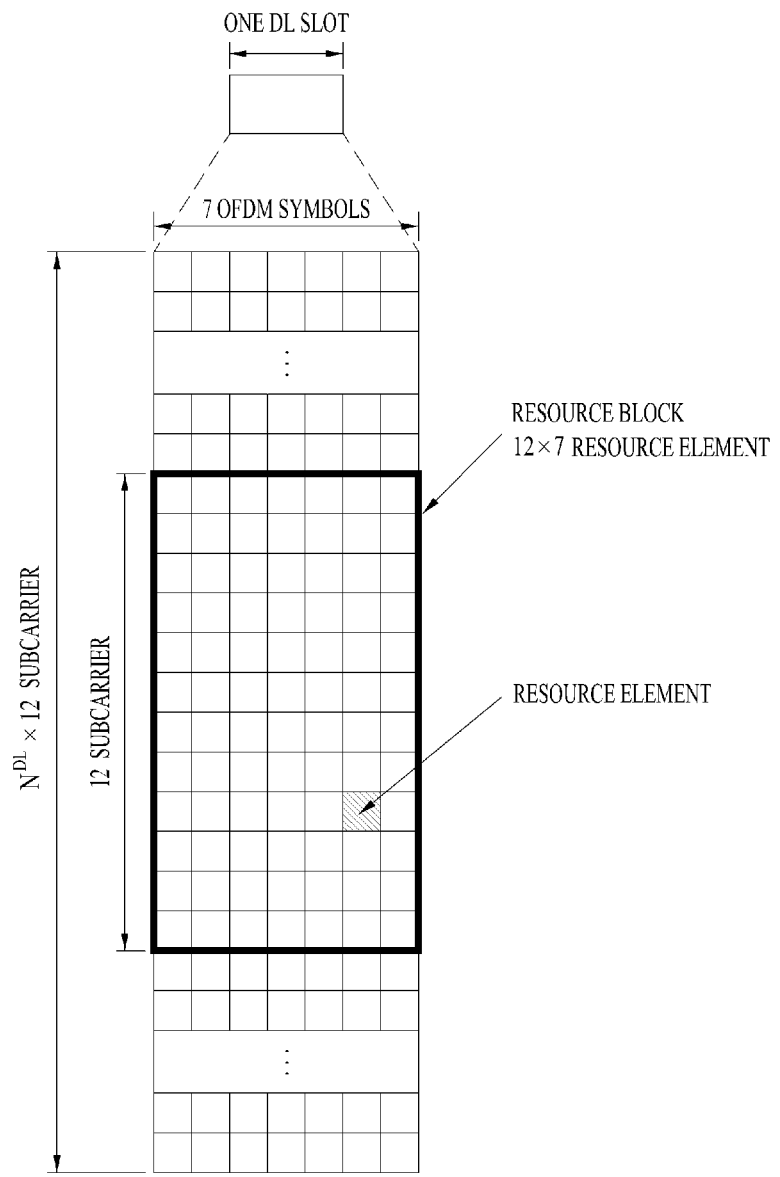
FIG. 3 is a diagram for an example of a resource grid for a downlink slot.

FIG. 3 is a diagram for an example of a resource grid for a downlink slot.

Referring to FIG. 3, one downlink (DL) slot may include a plurality of OFDM symbols in time domain. In particular, one DL slot exemplarily includes 7(6) OFDM symbols and one resource block (RB) includes 12 subcarriers in frequency domain. Each element on a resource grid is called a resource element (hereinafter abbreviated RE). One resource block includes 12×7(6) resource elements. The number NDL of resource blocks included in a DL slot may depend on a DL transmission bandwidth. And, the structure of an uplink (UL) slot may be identical to that of the DL slot and OFDM symbol is replaced by SC-FDMA symbol.

Figure 4:
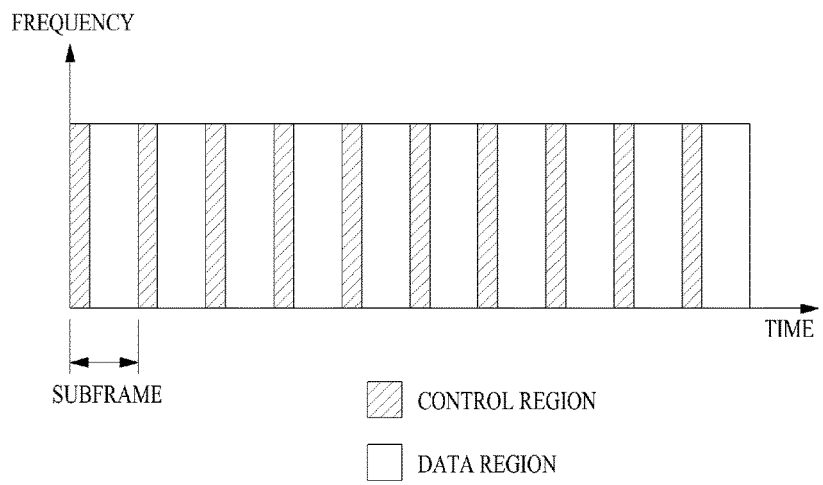
FIG. 4 is a diagram for an example of a structure of a downlink subframe.

FIG. 4 is a diagram for an example of a structure of a downlink subframe.

Referring to FIG. 4, maximum 3 (4) OFDM symbols situated at a fore part of a first slot of one subframe correspond to a control region to which control channels are assigned. The rest of OFDM symbols correspond to a data region to which PDSCH (physical downlink shared channel) is assigned. Examples of DL control channels used by 3GPP LTE may include PCFICH (Physical Control Format Indicator Channel), PDCCH (Physical Downlink Control Channel), PHICH (Physical hybrid automatic repeat request indicator Channel) and the like. The PCFICH is transmitted in a first OFDM symbol of a subframe and carries information on the number of OFDM symbols used for a transmission of a control channel within the subframe. The PHICH is a response channel in response to UL and carries ACK/NACK (acknowledgement/non-acknowledgement) signal for HARQ (hybrid automatic repeat request).

Control information carried on PDCCH may be called downlink control information (hereinafter abbreviated DCI). The DCI includes resource allocation information for a UE or a UE group and different control information. For instance, the DCI includes UL/DL scheduling information, UL transmit (Tx) power control command, and the like.

Control information carried on PDCCH may be called downlink control information (DCI: downlink control indicator). A DCI format is defined by a format of 0, 3, 3A, 4 for an uplink and the DCI format is defined by formats of 1, 1A, 1B, 1C, 1D, 2, 2A, 2B, 2C and the like for a downlink. A type of information field, the number of information field, the number of bit of each information field and the like vary according to a DCI format. For instance, the DCI format may be able to selectively include a hopping flag, an RB assignment, an MCS (modulation coding scheme), an RV (redundancy version), an NDI (new data indicator), a TPC (transmit power control), a HARQ process number, a PMI (precoding matrix indicator) confirmation and the like according to a usage. Hence, a size of control information matched with a DCI format varies according to the DCI format. Meanwhile, an arbitrary DCI format can be used to transmit control information of two or more types. For instance, the DCI format 0/1A is used to carry the DCI format 0 or the DCI format 1. The DCI format 0 and the DCI format 1 are distinguished by a flag field.

PDCCH carries a transmission format and resource allocation information of DL-SCH (downlink shared channel), a transmission format and resource allocation information of UL-SCH (uplink shared channel), paging information on a PCH (paging channel), system information on a DL-SCH, resource allocation information of an upper layer control message such as a random access response transmitted on PDSCH, a transmit power control command set for an individual user equipments within a random user equipment (UE) group, information on activation indication of VoIP (voice over IP), and the like. A plurality of PDCCHs can be transmitted in a control region and a user equipment is able to monitor a plurality of the PDCCHs. PDCCH is configured with the aggregation of at least one or more contiguous CCEs (control channel elements). CCE is a logical assignment unit used to provide PDCCH with a code rate in accordance with a state of a radio channel. CCE corresponds to a plurality of REGs (resource element groups). A format of PDCCH and the number of bits of an available PDCCH are determined according to correlation between the number of CCEs and a code rate provided by the CCE. A base station determines a PDCCH format in accordance with DCI to be transmitted to a user equipment and attaches a CRC (cyclic redundancy check) to control information. The CRC is masked with a unique identifier (e.g., RNTI (radio network temporary identifier)) in accordance with an owner or usage of PDCCH. If PDCCH is provided for a specific user equipment, the CRC can be masked with a unique identifier of the corresponding user equipment, i.e., C-RNTI (i.e., Cell-RNTI). If PDCCH is provided for a paging message, the CRC can be masked with a paging identifier (e.g., P-RNTI (Paging-RNTI)). If PDCCH is provided for system information, and more particularly, for a system information block (SIB), the CRC can be masked with a system information identifier (e.g., SI-RNTI (system information-RNTI). If PDCCH is provided for a random access response, the CRC can be masked with RA-RNTI (random access-RNTI).

PDCCH carries a message known as a DCI (downlink control information) and the DCI includes resource allocation information for a UE or a UE group and different control information. In general, a plurality of PDCCHs can be transmitted in a subframe. Each of a plurality of the PDCCHs is transmitted using one or more CCEs (control channel element). In this case, the CCE means a unit corresponding to 9 sets of REGs each of which is configured with 4 resource elements. And, 4 QPSK (quadrature phase shift keying) symbols are mapped to each of the REGs. Resource elements occupied by RS (reference signal) are not included in the REG. In particular, the total number of REGs in OFDM symbol may vary depending on whether a cell-specific reference signal exists. The concept of REG for mapping 4 resource elements to one group may apply to other DL control channels (e.g., PCFICH, PHICH, etc.). In particular, the REG is used as a basic resource unit of the control region. Table 1 shows PDCCH format, in which 4 kinds of PDCCH formats are supported.

TABLE 1

| PDCCH format | Number of CCEs (n) | Number of REGs | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

CCEs are contiguously used in a manner of being indexed. In order to simplify a decoding process, PDCCH including a format configured with n CCEs may start with CCE having an index equal to the multiple of n. The number of CCEs used for a transmission of a specific PDCCH is determined by a base station in accordance with a channel state. For instance, a single CCE may be sufficient for a PDCCH provided for a user equipment having a good DL channel state (e.g., a case that the user equipment is located in the vicinity of a base station). On the other hand, in case of PDCCH provided for a user equipment having a poor channel state (e.g., a case that the user equipment is located on a cell edge or boundary), 8 CCEs may be required for sufficient robustness. Besides, a power level of PDCCH may be adjusted in a manner of being matched to the channel state.

LTE defines a CCE set where PDCCH is able to be positioned for each of the user equipments. The CCE set for which a user equipment is able to search its own PDCCH is called a PDCCH search space, simply a search space (SS). An individual resource to which PDCCH is able to be transmitted thereto within the SS is called a PDCCH candidate. One PDCCH candidate corresponds to 1, 2, 4, or 8 CCEs according to a CCE aggregation level. A base station transmits an actual PDCCH (DCI) via an arbitrary PDCCH candidate within the SS and a user equipment monitors the SS to find out the PDCCH (DCI). Specifically, the user equipment attempts a blind decoding (BD) for PDCCH candidates within the SS.

In LTE system, the SS may have a different size in accordance with each PDCCH format. And, a USS (UE-specific search space) and a CSS (common search space) are separately defined. The USS is also called a dedicated search space. The UE-specific search space may be individually set for each of user equipments and a range of the common search space is known to all user equipments. The UE-specific and the common search space can be overlapped for a given user equipment. If all CCEs are already allocated to different user equipments in the USS, which is configured for a specific UE, since there is no remaining CCE, a base station may not find out CCE resources enough to transmit PDCCH to the specific user equipment in a given subframe. In order to minimize this blocking that may be kept in a next subframe, a start point of the UE-specific search space is modified by a UE-specific hopping sequence in every subframe. Table 2 shows sizes of a common search space and a UE-specific search space.

TABLE 2

| PDCCH format | Number of CCEs (n) | Number of PDCCH candidates in Common | Number of PDCCH candidates in UE-specific |
|---|---|---|---|
| 0 | 1 | — | 6 |
| 1 | 2 | — | 6 |
| 2 | 4 | 4 | 2 |
| 3 | 8 | 2 | 2 |

In order to reduce a calculation load of a user equipment due to a blind decoding (BD) attempt count, the user equipment does not perform searches in accordance with all the defined DCI formats at the same time. In general, the user equipment always searches a UE-search space for DCI format 0 and DCI format 1A. The DCI format 0 and the DCI format 1A are equal to each other in size and may be identified by a flag included in a message. And, the user equipment may be requested to receive an additional format, e.g., format 1, 1B, or 2 according to the PDSCH transmission mode set by a base station. The user equipment may be able to search a common search space for DCI format 1A and DCI format 1C. The user equipment may be configured to search DCI format 3 or DCI format 3A. Similar to the DCI format 0 and the DCI format 1A, the DCI format 3 and the DCI format 3A are equal to each other in size and the user equipment may be able to identify a DCI format using CRC scrambled by different identifiers (common identifier). A transmission mode to configure multi-antenna technology and content of DCI formats are described in the following.

Figure 5:
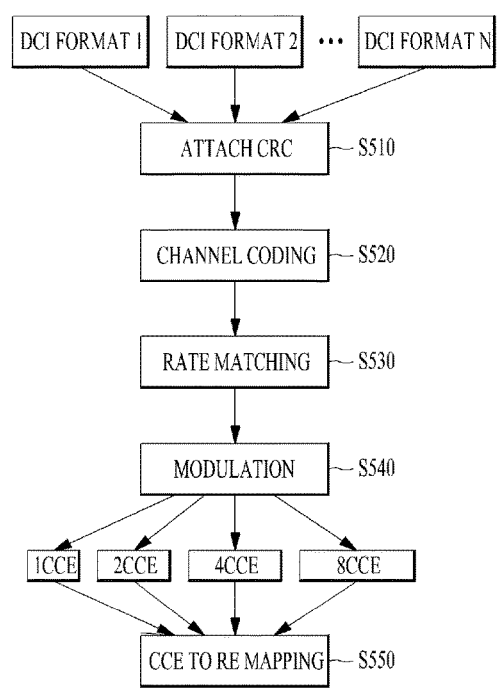
FIG. 5 is a flowchart of PDCCH (physical downlink control channel) configuration performed by a base station.

Transmission Mode (TM)
Transmission mode 1: transmission from a single base station antenna port
Transmission mode 2: transmit diversity
Transmission mode 3: open-loop spatial multiplexing
Transmission mode 4: closed-loop spatial multiplexing
Transmission mode 5: multi-user MIMO
Transmission mode 6: closed-loop rank-1 precoding
Transmission mode 7: transmission using UE-specific reference signals DCI format
Format 0: resource grants for the PUSCH transmissions (uplink)
Format 1: resource assignments for single codeword PDSCH transissions (transmission modes 1, 2 and 7)
Format 1A: compact signaling of resource assignments for single codeword PDSCH (all modes)
Format 1B: compact resource assignments for PDSCH using rank-1 closed loop precoding (mode 6)
Format 1C: very compact resource assignments for PDSCH (e.g. paging/broadcast system information)
Format 1D: compact resource assignments for PDSCH using multi-user MIMO (mode 5)
Format 2: resource assignments for PDSCH for closed-loop MIMO operation (mode 4)
Format 2A: resource assignments for PDSCH for open-loop MIMO operation (mode 3)
Format 3/3A: power control commands for PUCCH and PUSCH with 2-bit/1-bit power adjustment FIG. 5 is a flowchart of PDCCH (physical downlink control channel) configuration performed by a base station.

Referring to FIG. 5, a base station generates control information according to a DCI format. The base station may be able to select one DCI format among a plurality of DCI formats (DCI format 1, 2, . . . , N) according to the control information to be transmitted to a user equipment. A CRC (cyclic redundancy check) used for detecting an error is attached to the control information generated according to each of the DCI formats [S410]. The CRC is masked with an identifier (e.g., RNTI (radio network temporary identifier)) in accordance with an owner or usage of PDCCH. In other word, PDCCH is CRC scrambled with the identifier (e.g., RNTI).

Table 3 shows an example of identifiers masked to PDCCH.

TABLE 3

| Type | Identifier | Description |
|---|---|---|
| UE-specific | C-RNTI, temporary C-RNTI, semi-persistent C-RNTI | Used for a unique UE identification |
| Common | P-RNTI | Used for paging message |
| | SI-RNTI | Used for system information |
| | RA-RNTI | Used for random access response |

In case that a C-RNTI, a temporary C-RNTI, or a semi-persistent C-RNTI is used, PDCCH carries control information for corresponding specific user equipment. In case that the rest of RNTI is used, the PDCCH carries common control information by which all user equipments within a cell receive. A base station creates a coded data (codeword) by performing a channel coding on the CRC attached control information [S420]. The base station performs a rate matching in accordance with a CCE aggregation level assigned to a PDCCH format [S430] and generates modulated symbols by modulating the coded data [S440]. The modulated symbols configuring one PDCCH may have a CCE aggregation level set to one of 1, 2, 4 and 8. Thereafter, the base station maps the modulated symbols to physical resource elements (RE), i.e., CCE to RE mapping [S450].

Figure 6:
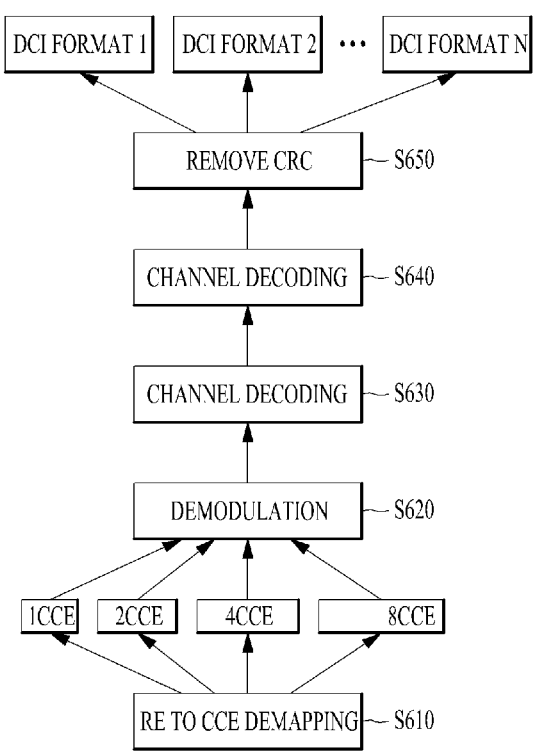
FIG. 6 is a flowchart for explaining an example of PDCCH processing process of a user equipment.

FIG. 6 is a flowchart for explaining an example of PDCCH processing process of a user equipment.

Referring to FIG. 6, a user equipments de-maps a physical resource element to CCE, i.e., RE to CCE demapping [S510]. Since the user equipment does not know which CCE aggregation level should be used to receive PDCCH, the user equipment demodulates each of the CCE aggregation levels [S520]. The user equipment performs a rate dematching in accordance with the demodulated data. Since the user equipment does not know which DCI format (or DCI payload size)-having control information should be received, the user equipment performs a rate de-matching in accordance with each of the DCI formats (or DCI payload size) [S530]. The user equipment performs a channel decoding on the de-matched data according to a code rate, checks a CRC, and then detects whether there is an error [S540]. If an error does not occur, it indicates that the user equipment has found out the PDCCH for its own. If an error occurs, the user equipment continuously performs a blind decoding on a different CCE aggregation level or a different DCI format (or DCI payload size). The user equipment, which has found out the PDCCH of its own, eliminates the CRC from the decoded data and then obtains control information.

A plurality of PDCCHs for a plurality of user equipments can be transmitted within a control region of an identical subframe. A base station does not provide information on where a corresponding PDCCH is situated within the control region to the user equipment. Hence, the user equipment searches the subframe for PDCCH for its own in a manner of monitoring a set of PDCCH candidates. In this case, the verb 'monitor' means that the user equipment attempts to decode each of the received PDCCH candidates in accordance with each of the PDCCH formats and each of the CCE aggregation levels. This is called a blind decoding (blind detection). By using the blind decoding, the user equipment simultaneously performs an identification of the PDCCH transmitted to the user equipment and a decoding of the control information transmitted on a corresponding PDCCH. For instance, if the PDCCH is de-masked with C-RNTI, if an error does not occur, it indicates that the user equipment has found out the PDCCH of its own.

Meanwhile, in order to reduce an overhead of blind decoding, the number of DCI formats is defined less than a kind of the control information transmitted on a PDCCH. The DCI format includes a plurality of information fields different from each other. According to the DCI format, a kind of the information field, the number of the information field, a bit number of each of the information fields and the like may vary. In particular, a size of the control information, which is matched with the DCI format, may vary according to the DCI format. A random DCI format can be used for transmitting 2 or more kinds of the control information.

Table 4 shows an example of control information transmitted by a DCI format 0. Bit size of each information field is just an exemplary and does not limit the bit size of each field.

TABLE 4

| Information Field | bit(s) |
| --- | --- |
| (1) Flag for format0/format1A differentiation | 1 |

TABLE 4-continued

| Information Field | bit(s) |
| --- | --- |
| (2) Hopping flag | 1 |
| (3) Resource block assignment and hopping resource Allocation | $\lceil \log_2(N_{RB}^{UL}(N_{RB}^{UL} + 1)/2) \rceil$ |
| (4) Modulation and coding scheme and redundancy Version | 5 |
| (5) New data indicator | 1 |
| (6) TPC command for scheduled PUSCH | 2 |
| (7) Cyclic shift for DM RS | 3 |
| (8) UL index (TDD) | 2 |
| (9) CQI request | 1 |

The flag field is an information filed for distinguishing the DCI format 0 and the DCI format 1. In particular, the DCI format 0 and the DCI format 1A have a same payload size and are categorized by the flag field. A resource block assignment and hopping resource allocation field may have a different bit size in accordance with a hopping PUSCH or a non-hopping PUSCH. The resource block assignment and hopping resource allocation field for the non-hopping PUSCH provides ceiling[log 2(NULRB(NULRB+1)/2)] bit to allocate a resource to a first slot in an uplink subframe. In this case, NULRB indicates the number of resource blocks included in an uplink slot and depends on an uplink transmission bandwidth configured in a cell. Hence, a payload size of the DCI format 0 may vary according to the uplink bandwidth. The DCI format 1A includes an information field necessary for PDSCH assignment and a payload size of the DCI format 1A may also vary according to a downlink bandwidth. The DCI format 1A provides the DCI format 0 with a reference information bit size. Hence, if the number of information bits of the DCI format 0 is smaller than the number of information bits of the DCI format 1A, '0' is attached to the DCI format 0 until the payload size of the DCI format 0 becomes identical to the payload size of the DCI format 1A. A padding field of the DCI format is filled with the attached '0'.

Figure 7:
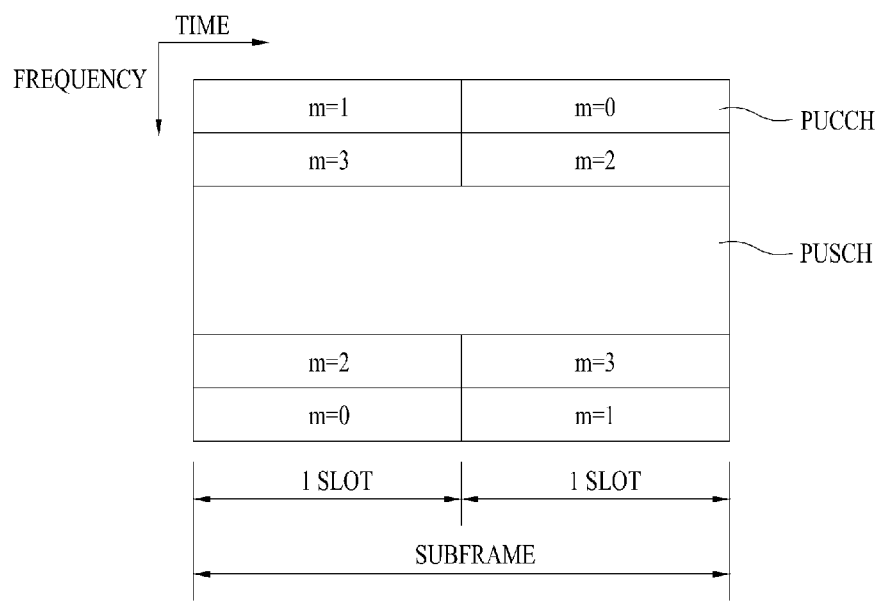
FIG. 7 is a diagram for a structure of an uplink subframe.

FIG. 7 is a diagram for a structure of an uplink subframe.

Referring to FIG. 7, an uplink subframe includes a plurality of slots (e.g., 2 slots). A slot may include a different number of SC-FDMA symbols according to a length of CP. As one example, in case of a normal CP, a slot may include 7 SC-FDMA symbols. A UL subframe may be divided into a control region and a data region in frequency domain. The data region includes PUSCH and can be used for transmitting a data signal such as an audio and the like. The control region includes PUCCH and can be used for transmitting control information. The PUCCH includes a RB pair (e.g., m=0, 1, 2, 3) situated at the both ends of the data region and hops on a slot boundary. The control information includes a HARQ-ACK/NACK, a CQI (Channel Quality Information), a PMI (Precoding Matrix Indicator), an RI (Rank Indication), and the like.

Figure 8:
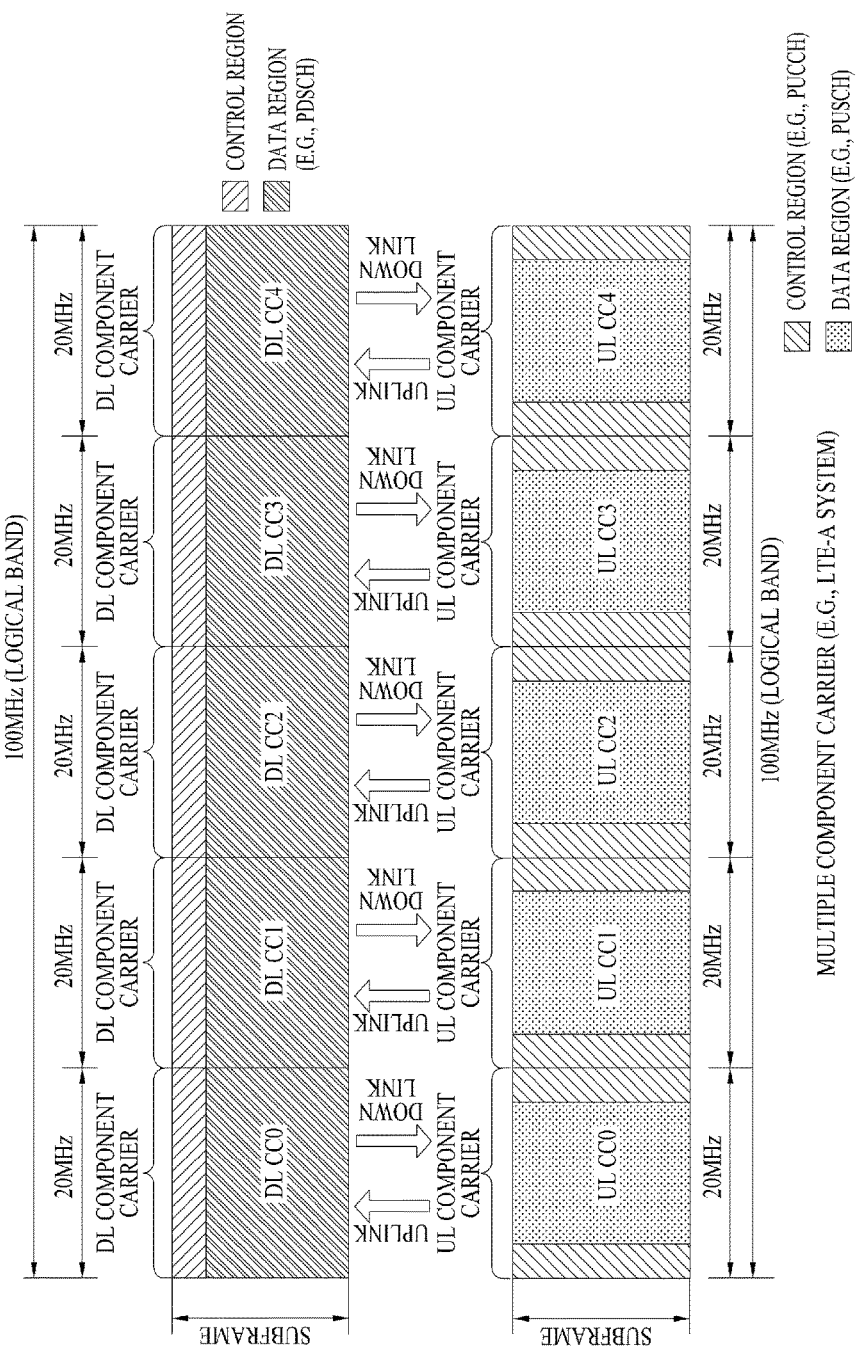
FIG. 8 is a diagram for explaining an example of a carrier aggregation (CA) communication system.
Figure 9:
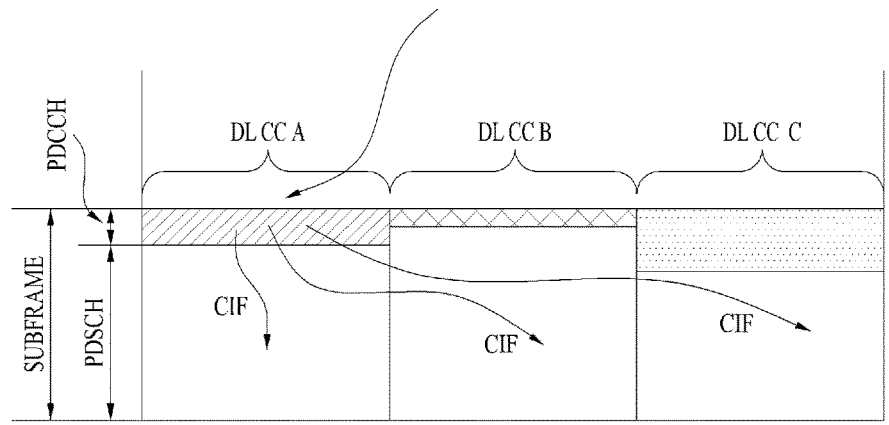
FIG. 9 is a diagram illustrating scheduling of the case in which a plurality of carriers are aggregated.

FIG. 8 is a diagram for explaining an example of a carrier aggregation (CA) communication system.

Referring to FIG. 8, a wider UL/DL bandwidth can be supported in a manner of aggregating a plurality of UL/DL component carriers (CC). The terminology 'component carrier' can be replaced by such an equivalent terminology as a carrier, a cell, and the like. Each of the component carriers may be adjacent to each other or non-adjacent to each other in frequency domain. The bandwidth of each of the component carriers can be determined independently. An asymmetric carrier aggregation, which means that the number of downlink component carrier (DL CC) and the number of uplink component carrier (UL CC) are different from each other, is also possible. Meanwhile, control information can be set to be transceived on a specific CC only. The specific CC is called a primary CC and the rest of CCs may be called a secondary CC.

As one example, in case that a cross-carrier scheduling (or a cross-CC scheduling) is applied, PDCCH for DL assignment is transmitted on a DL CC #0 and a corresponding PDSCH can be transmitted on a DL CC #2. For a cross-CC scheduling, a CIF (carrier indicator field) can be used. Whether a CIF exists or not within a PDCCH can be semi-statically and user-specifically (or user group-specifically) configured via an upper layer signaling (e.g., RRC signaling). Basics of PDCCH transmission can be summarized as follows.

- CIF disabled: PDCCH on DL CC allocates a PDSCH resource on the same DL CC or a PUSCH resource on a singly linked UL CC.
- No CIF
- Identical to LTE PDCCH structure (identical coding, identical CCE-based resource mapping) and DCI format
- CIF enabled: PDCCH on DL CC allocates a PDSCH or PUSCH resource on a specific DL/UL CC among a plurality of aggregated DL/UL CCs using a CIF.
- Expanded LTE DCI format including a CIF
- CIF (if configured) is a stationary x-bit field (e.g., x=3)
- CIF (if configured) position is fixed irrespective of a DCI format size
- Reuse of LTE PDCCH structure (identical coding, identical CCE-based resource mapping)

In case that a CIF exists within a PDCCH, a base station may be able to assign a PDCCH monitoring DL CC set to reduce BD complexity of a user equipment side. The PDCCH monitoring DL CC set is a part of aggregated whole DL CC and includes at least one DL CC. A user equipment may be able to perform a detection/decoding of the PDCCH on a corresponding DL CC only. In particular, for a scheduling of PDSCH/PUSCH, the base station may be able to transmit the PDCCH on the PDCCH monitoring DL CC only. The PDCCH monitoring DL CC set may be configured UE-specifically, UE group-specifically or cell-specifically. The terminology 'PDCCH monitoring DL CC' can be replaced by such an equivalent terminology as a monitoring carrier, a monitoring cell, and the like. And, a CC aggregated for a user equipment can be replaced by such an equivalent terminology as a serving CC, a serving carrier, a serving cell, and the like.

FIG. 8 is a diagram for an example of a scheduling in case that a plurality of carriers are aggregated. Assume that 3 DL CCs are aggregated and a DL CC A is configured as a PDCCH monitoring DL CC. DL CC A~C can be called a serving CC, a serving carrier, a serving cell, and the like. If a CIF is disabled, each of DL CCs may be able to transmit PDCCH, which schedules PDSCH of each of the DL CCs, only without a CIF according to an LTE PDCCH rule. On the other hand, if a CIF is enabled by an (UE-group-specific or cell specific) upper layer signaling, only the DL CC A (monitoring DL CC) may be able to transmit the PDCCH, which schedules the PDSCH of a different DL CC as well as the PDSCH of the DL CC A using the CIF. In this case, PDCCH is not transmitted on DL CC B and DL CC C, which are not configured as the PDCCH monitoring DL CC. Hence, the DL CC A (monitoring DL CC) should include all of a PDCCH search space related to the DL CC A, a PDCCH search space related to the DL CC B, and a PDCCH search space related to the DL CC C. In the present specification, assume that a PDCCH search space is defined according to a carrier.

As mentioned in the foregoing description, LTE-A considers a use of a CIF in PDCCH to perform a cross-CC scheduling. Whether to use a CIF (i.e., supporting a cross-CC scheduling mode or a non-cross-CC scheduling mode) and switching between modes can be semi-statically/UE-specifically configured via an RRC signaling. After the RRC signaling process is underwent, a user equipment can recognize whether a CIF is used in PDCCH to be scheduled for the user equipment.

Figure 10:
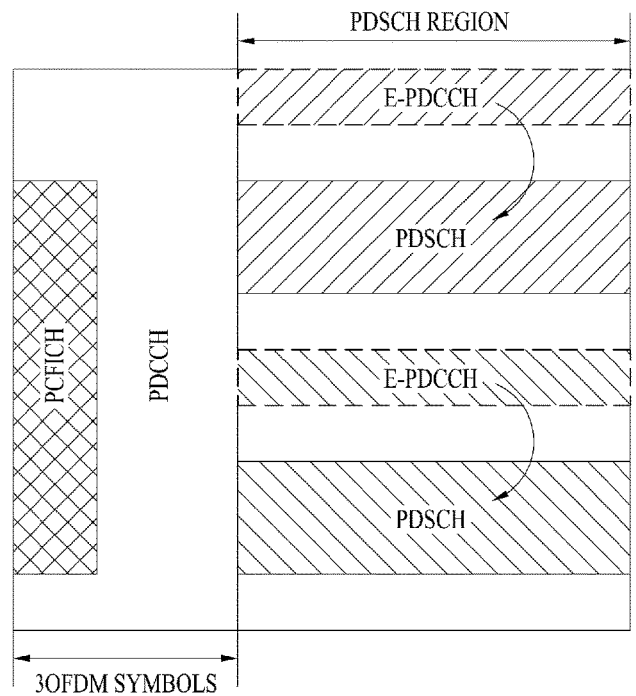
FIG. 10 is a diagram showing an EPDCCH and a PDSCH scheduled by the EPDCCH.

FIG. 10 is a diagram showing an EPDCCH and a PDSCH scheduled by the EPDCCH.

Referring to FIG. 10, the EPDCCH may be generally transmitted via a PDSCH region for transmitting data. A UE should perform a blind decoding process of a search space for the EPDCCH in order to detect presence/absence of the EPDCCH thereof. The EPDCCH performs the same scheduling operation (that is, PDSCH or PUSCH control) as the existing PDCCH. However, if the number of UEs accessing a node such as an RRH is increased, a larger number of EPDCCHs is allocated to a PDSCH region, thereby increasing the number of times of blind decoding to be performed by the UE and increasing complexity.

Based on the aforementioned description, the present invention proposes a method for effectively determining a configurable aggregation level (AL) candidate on a specific EPDCCH set in an environment in which an enhanced PDCCH (EPDCCH) as a control channel transmitted in a legacy PDSCH region is used instead of a legacy PDCCH.

According to the present invention, with regard to definition of a PDSCH region, the PDSCH region is defined as a region including the remaining OFDM symbols except for initial some OFDM symbols used for transmission of a legacy PDCCH in a subframe (SF) including a plurality of OFDM symbols. In addition, the definition of the PDSCH region includes the case in which all OFDM symbols of a corresponding subframe are designated and used as the PDSCH region because an OFDM symbol used for transmission of a PDCCH does not exist. In addition, it is obvious that an EPDCCH that will be described below is used to perform communication between an eNB and a relay as well as a general UE.

For convenience of description of the present invention, a basic unit of a resource included in an EPDCCH is referred to as an ECCE and a corresponding ECCE is defined to include a predefined number of resource elements (REs). In addition, when the number of ECCEs used for transmission of a specific EPDCCH is N, an aggregation level (AL) N may indicate this case.

Hereinafter, for convenience of description, the proposed method will be described in terms of a 3GPP LTE system. However, a scope of a system to which the proposed method is applied can also be extended to a system with different feature from the 3GPP LTE system.

According to the present invention, at least one of the number of ECCEs (i.e., change in AL) used for transmission of a specific EPDCCH or the number of REs included in one ECCE may be changed according to at least one of change in a channel state between an eNB and a UE and change in the number of available REs for transmission of an EPDCCH on a specific physical resource block (PRB) pair, for transmission and reception of an EPDCCH with high reliability. Here, the aforementioned methods can perform transmission of an EPDCCH with high reliability by appropriately changing a coding rate for transmission of an EPDCCH according to a situation change (e.g., when a channel state is not good, a relatively large number of ECCEs (i.e., a relatively high AL) are used for transmission of an EPDCCH so as to relatively reduce an EPDCCH coding rate) or by appropriately maintaining the coding rate for transmission of an EPDCCH irrespective of a situation change (i.e., when the number of available REs for transmission of an EPDCCH on a specific PRB pair is smaller than a predefined threshold value (i.e., $X_{th}$), a relatively high number of ECCEs (i.e., a relatively high AL) is used for transmission of an EPDCCH so as to an appropriate level of EPDCCH coding rate).

In the case of a legacy PDCCH, the number (or a maximum number of EPDCCH candidates) of EPDCCH candidates for each AL for performing blind decoding by a UE on a search space (SS) is pre-defined (e.g., in the case of a UE-specific SS (USS), decoding numbers of times{6, 6, 2, 2} are defined for respective ALs {1, 2, 4, 8}), and the UE may receive specific transmission mode (TM or fallback TM) based control information (e.g., TM-specific DCI format or fallback DCI format) transmitted to a UE by an eNB by performing blind decoding on the number of EPDCCH candidates defined for each AL on CSS/USS.

The present invention proposes a method for effectively configurable AL candidates on a specific EPDCCH set, and according to an embodiment of the present invention, a UE/eNB can effectively receive/transmit control information.

The embodiments of the present invention can also be extensively applied to the case in which the number of EPDCCH transmission types (e.g., localized EPDCCH (L-EPDCCH) or distributed EPDCCH (D-EPDCCH)) or the number of available REs for transmission of an EPDCCH in a specific PRB pair is more or less than a predefined threshold number $X_{\_th}$.

The embodiments of the present invention can also be extensively applied to the case in which at least one EPDCCH set (here, a specific EPDCCH set includes predefined one or more PRB pairs) is configured for transmission of an EPDCCH, ALs configured for respective EPDCCH sets have the same configuration, or configurations of ALs configured for respective EPDCCH sets are different.

The embodiments of the present invention can also be extensively applied to the case, in an environment to which a carrier aggregation (CA) scheme is applied, a plurality of EPDCCH sets interwork with different cells or exist in different cells, or an EPDCCH (or PDCCH)-based cross carrier scheduling (CCS) method is applied on a predetermined scheduling cell. Similarly, the embodiments of the present invention can also be extensively applied to the case, in an environment to which a CA scheme is applied, a plurality of EPDCCH sets interwork with different component carriers (CCs) or exist in different CCs, or an EPDCCH (or PDCCH)-based CCS method is applied on a predetermined scheduling component carrier.

In addition, the embodiments of the present invention can also be extensively applied to any case in which EPDCCH CSS/USS-based communication is performed in an environment (e.g., an environment in which an NCT-based initial access operation needs to be performed) in which a new carrier type (NCT) is used as a CA scheme together with a legacy cell (or a component carrier) with backward compatibility or an NCT is used alone (without (downlink) legacy cell or component carrier).

In the present invention, the term 'TM-specific DCI format' may be used as the term that collectively indicates (specific) DCI formats having a relatively high payload size (bit size) compared with 'fallback DCI format'. For example, TM-specific DCI format may restrictedly indicate DCI format 2/2A/2B/2C (i.e., specific DCI formats having a relatively and materially high payload size (bit size)) compared with fallback DCI format among TM-specific DCI formats) having a relatively high payload size (bit size) compared with DCI format 0/1A (i.e., fallback DCI format).

First Embodiment

According to a first embodiment of the present invention, a configurable aggregation AL candidate on a specific EPDCCH set may be configured to be determined according to at least one of the number of PRB pairs included in a corresponding EPDCCH set, a system bandwidth, or a type of DCI format transmitted (monitored by a UE) on the corresponding EPDCCH set.

For example, under an environment in which two EPDCCH sets (e.g., EPDCCH set #1 including 2 PRB pairs and EPDCCH set #2 including 4 PRB pairs) are configured, after an AL candidate for each EPDCCH set is configured (e.g., as the number of PRB pairs included in a specific EPDCCH set is increased, relatively high AL candidates are allocated) in proportion to the number of PRB pairs included in each EPDCCH sets, different AL candidate configurations may also be configured to be applied according to a type of DCI format transmitted (or monitored by a UE) on a corresponding EPDCCH set in terms of a specific EPDCCH set. That is, in an environment in which two EPDCCH sets (e.g., EPDCCH set #1 including two PRB pairs and EPDCCH set #2 including four PRB pairs) are configured, 'AL {1, 2, 4, 8} for EPDCCH set #1' and 'AL {1, 2, 8, 16} for EPDCCH set #2' are configured, 'AL {1, 2, 4, 8} when DCI format 1A is transmitted on EPDCCH set #2' and 'AL {1, 2, 8, 16} when DCI format 2C is transmitted on EPDCCH set #2' may also be configured. Similarly, in an environment in which two EPDCCH sets (i.e., EPDCCH set #1 including two PRB pairs and EPDCCH set #2 including four PRB pairs) are configured, as the number of PRB pairs included in a specific EPDCCH set is increased, relatively high AL candidates or a relatively high number of EPDCCH candidates are allocated is configured to be allocated, different AL candidates may also be configured to be applied according to a type of DCI format transmitted on a corresponding EPDCCH set in terms of a specific EPDCCH set.

The first embodiment of the present invention may be configured to be restrictively applied only to the case in which a predefined specific DCI format (e.g., DCI format 2C) is transmitted (or monitored by a UE) on an EPDCCH set.

For example, a search space (SS) is configured with 'AL {1, 2, 4, 8}' on an EPDCCH set including four PRB pairs, and when AL candidates for each EPDCCH is configured in proportion to the number of PRB pairs included in an EPDCCH set (e.g., as the number of PRB pairs included in a specific EPDCCH set is increased, relatively high AL candidates are configured to be allocated or a relatively high number of EPDCCH candidates are configured to be allocated, the configured SS may be configured to be changed to 'AL {1, 2, 8, 16}' in the case in which predefined DCI format 2C is transmitted on a corresponding EPDCCH set and to be maintained as pre-configured 'AL {1, 2, 4, 8}' in the case in which DCI format 1A (i.e., other DCI formats except for DCI format 2C) is transmitted on the corresponding EPDCCH set.

Furthermore, at least one of information about "a threshold value for the number of PRB pairs included in an EPDCCH set", "a type of DCI format (monitored by a UE) that is pre-classified for deduction of different AL candidate configurations" or "a specific DCI format associated with whether the aforementioned embodiment is applied", for deduction of different configurable AL candidates on a specific EPDCCH set may be indicated to a UE by an eNB via a predefined signal (e.g., a higher layer or physical layer signal) or may be configured to be determined based on an (pre-shared) implicit rule.

Figure 11:
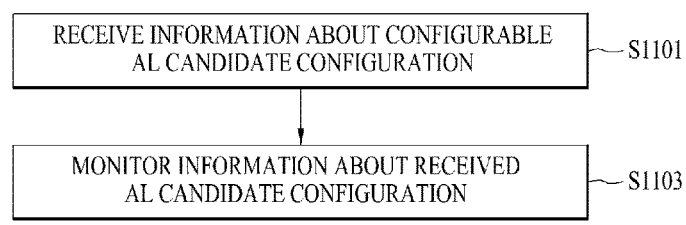
FIG. 11 is a diagram illustrating a method for detecting control information according to the first embodiment of the present invention.

FIG. 11 is a diagram illustrating a method for receiving control information according to the first embodiment of the present invention. With reference to FIG. 11, the first embodiment of the present invention will now be described. A UE may receive the aforementioned information about a configurable AL candidate configuration (S1101).

Accordingly, the UE may monitor a candidate (i.e., EPDCCH candidate) for detection of control information through an EPDCCH based on information about the received AL candidate configuration (S1103).

Second Embodiment

According to a second embodiment of the present invention, when a specific EPDCCH set is configured to include (relatively) high AL candidates, a (relatively) high AL candidate included in a corresponding EPDCCH set may be configured to be determined according to at least one of the number of PRB pairs included in a corresponding EPDCCH set, a system bandwidth, or a type of DCI format transmitted (monitored by a UE) on the corresponding EPDCCH set. In addition, when a specific EPDCCH set is configured to include (relatively) low AL candidates, a (relatively) low AL candidate included in a corresponding EPDCCH set may be configured to be determined according to one of the number of PRB pairs included in a corresponding EPDCCH set, a system bandwidth, or a type of DCI format transmitted (monitored by a UE) on the corresponding EPDCCH set.

In addition, when two EPDCCH sets are configured such that EPDCCH set #1 is configured to include a relatively low AL candidate and EPDCCH set #2 is configured to included a relatively high AL candidate, different AL candidates may be configured in proportion to the number of PRB pairs included in the corresponding EPDCCH set in terms of a specific EPDCCH set (e.g., as the number of PRB pairs included in a specific EPDCCH set is increased, relatively high AL candidates, the number of EPDCCH candidates of relatively high AL candidates, or the number of relatively high EPDCCH candidates are allocated).

For example, when EPDCCH set #1 and EPDCCH set #2 include two and four PRB pairs, respectively, 'AL $\{1, 2\}$ for EPDCCH set #1' and 'AL $\{4, 8\}$ for EPDCCH set #2' may be configured, and as another example, when EPDCCH set #1 and EPDCCH set #2 include four and eight PRB pairs, 'AL $\{2, 4\}$ for EPDCCH set #1' and 'AL $\{8, 16\}$ for EPDCCH set #2' may be configured.

Furthermore, information about "a threshold value for the number of PRB pairs included in an EPDCCH set" or "a specific DCI format associated with whether the aforementioned embodiment is applied" for deduction of different configurable AL candidates on a specific EPDCCH set or at least one of information about "EPDCCH sets configured to include (relatively) high AL candidates" or "EPDCCH sets configured to include (relatively) low AL candidates" may be indicated to a UE by an eNB via a predefined signal (e.g., a higher layer or physical layer signal) or may be configured to be determined based on an (pre-shared) implicit rule.

Third Embodiment

According to a third embodiment of the present invention, when specific DCI format for scheduling of uplink data communication is transmitted on a specific EPDCCH set, for example, when an additional transmission mode (e.g., UL MIMO) is configured for uplink so as to transmit additionally generated DCI format (i.e., DCI format 4) or to monitor the DCI format by a UE, a configurable AL candidate for the specific DCI format may be determined. That is, in this case, a configurable AL candidate for a specific DCI format may be configured to be determined according to one of the size of an uplink cell bandwidth, a ratio value of an uplink cell bandwidth and a downlink cell bandwidth (e.g., 'uplink cell bandwidth÷downlink cell bandwidth'), or the number of PRB pairs included in an EPDCCH set in which corresponding DCI format is transmitted. In addition, a configurable AL candidate for a specific DCI format may be configured to be determined according to one of the size of an uplink component carrier (CC) or a ratio value of an uplink CC bandwidth and a downlink CC bandwidth (e.g., 'uplink CC bandwidth÷downlink CC bandwidth').

For example, a specific DCI format for scheduling of uplink data communication to which an embodiment of the present invention is applied may be configured as DCI format 4 as representative DCI format that is additionally generated by configuring an additional transmission mode (e.g., UL MIMO) for uplink. The DCI format 4 may be configured with a relatively high payload size (bit size) (for transmission of information related to a UL MIMO operation) compared with DCI format 0 used for a basic transmission mode (e.g., Single-Antenna Port-based uplink data transmission).

An uplink cell bandwidth may be configured as a bandwidth of an uplink cell in which uplink communication is actually performed or a bandwidth of an uplink cell associated with a downlink cell in which corresponding DCI format (e.g., DCI format 4) is transmitted. Similarly, an uplink component carrier (CC) bandwidth may be configured as a bandwidth of an uplink component carrier (CC) in which uplink communication is actually performed or a bandwidth of an uplink component carrier (CC) associated with a downlink component carrier (CC) in which corresponding DCI format (e.g., DCI format 4) is transmitted.

In addition, a downlink cell bandwidth may be configured as a bandwidth of a downlink cell associated with an uplink cell in which uplink communication is actually performed or a bandwidth of a downlink cell in which corresponding DCI format (e.g., DCI format 4) is transmitted, and a downlink component carrier (CC) bandwidth may be configured as a bandwidth of a downlink component carrier (CC) associated with an uplink component carrier in which uplink communication is actually performed or a bandwidth of a downlink component carrier in which corresponding DCI format (e.g., DCI format 4) is transmitted.

Furthermore, the embodiments of the present invention can also be extensively applied to an environment in which an uplink/downlink cell bandwidth or an uplink/downlink component carrier bandwidth is applied by combining the aforementioned various embodiments of the present invention.

Furthermore, as an example of the above proposed methods, a plurality of pieces of information about "a threshold value of a size of an uplink cell (or CC) bandwidth" or "a threshold value of a ratio value of an uplink cell (or CC) bandwidth and a downlink cell (or CC) bandwidth" or a plurality of pieces of information about "a type of a specific DCI format for scheduling for uplink data communication for determination of a configurable AL candidate for the specific DCI format" or "a threshold value of the number of PRB pairs included in an EPDCCH set (in which a corresponding DCI format is transmitted)" for deduction of different configurable AL candidates for a specific DCI format for scheduling of uplink data communication may be indicated to a UE by an eNB via a predefined signal (e.g., a higher layer or physical layer signal) or may be configured to be determined based on an (pre-shared) implicit rule.

In addition, according to whether a ratio value of an uplink cell (or CC) bandwidth and a downlink cell (or CC) bandwidth is greater or smaller than a predefined threshold value, AL candidate configuration for a specific DCI format for scheduling of uplink data communication may be configured to be applied as AL candidate configuration for a specific DCI format transmitted on a downlink cell (or CC).

As a detailed embodiment of the present invention, when a ratio value of an uplink cell bandwidth and a downlink cell bandwidth or an uplink cell bandwidth is greater than a predefined threshold value, or the ratio value of the uplink cell bandwidth and the downlink cell bandwidth or the uplink cell bandwidth is greater or equal to the predefined threshold value, AL candidate configuration for a specific DCI format for scheduling of uplink data communication may be configured to apply AL candidate configuration (e.g., 'AL {1, 2, 8, 16}') for TM-specific DCI format (e.g., DCI format 2/2A/2B/2C) transmitted on a downlink cell. Similarly, when a ratio value of an uplink component carrier (CC) bandwidth and a downlink component carrier (CC) or an uplink component carrier (CC) bandwidth is greater than a predefined threshold value, or a ratio value of an uplink component carrier (CC) bandwidth and a downlink component carrier (CC) bandwidth or an uplink cell component carrier (CC) bandwidth is greater or equal to a predefined threshold value, AL candidate configuration for a specific DCI format for scheduling of uplink data communication may be configured to apply AL candidate configuration for TM-specific DCI format (i.e., DCI format 2/2A/2B/2C) transmitted on a downlink component carrier (CC).

On the other hand, when a ratio value of an uplink cell bandwidth and a downlink cell bandwidth or an uplink cell bandwidth is smaller than a predefined threshold value, or the ratio value of the uplink cell bandwidth and the downlink cell bandwidth or the uplink cell bandwidth is equal to or less than the predefined threshold value, AL candidate configuration for a specific DCI format for scheduling of uplink data communication may be configured to apply AL candidate configuration (e.g., 'AL {1, 2, 4, 8}') for fallback DCI format (e.g., DCI format 1A/0) transmitted on a downlink cell. Similarly, when a ratio value of an uplink component carrier (CC) bandwidth and a downlink component carrier (CC) or an uplink component carrier (CC) bandwidth is smaller than a predefined threshold value, or a ratio value of an uplink component carrier (CC) bandwidth and a downlink component carrier (CC) bandwidth or an uplink cell component carrier (CC) bandwidth is equal or less than a predefined threshold value, AL candidate configuration for a specific DCI format for scheduling of uplink data communication may be configured to apply AL candidate configuration for fallback DCI format (i.e., DCI format 1A/0) transmitted on a downlink cell (or CC).

According to another embodiment of the present invention, when a ratio value of an uplink cell bandwidth and a downlink cell bandwidth or an uplink cell bandwidth is greater than a predefined threshold value, or the ratio value of the uplink cell bandwidth and the downlink cell bandwidth or the uplink cell bandwidth is greater or equal to the predefined threshold value, AL candidate configuration for a specific DCI format (e.g., DCI format 4) for scheduling of uplink data communication may be configured to apply AL candidate configuration (e.g., 'AL {1, 2, 4, 8}') for fallback DCI format (e.g., DCI format 1A/0) transmitted on a downlink cell. Similarly, when a ratio value of an uplink component carrier (CC) bandwidth and a downlink component carrier (CC) or an uplink component carrier (CC) bandwidth is greater than a predefined threshold value, or a ratio value of an uplink component carrier (CC) bandwidth and a downlink component carrier (CC) bandwidth or an uplink cell component carrier (CC) bandwidth is greater or equal to a predefined threshold value, AL candidate configuration for a specific DCI format (e.g., DCI format 4) for scheduling of uplink data communication may be configured to apply AL candidate configuration for fallback DCI format (e.g., DCI format 1A/0) transmitted on a downlink component carrier (CC).

On the other hand, when a ratio value of an uplink cell bandwidth and a downlink cell bandwidth or an uplink cell bandwidth is smaller than a predefined threshold value, or the ratio value of the uplink cell bandwidth and the downlink cell bandwidth or the uplink cell bandwidth is equal to or less than the predefined threshold value, AL candidate configuration for a specific DCI format (e.g., DCI format 4) for scheduling of uplink data communication may be configured to apply AL candidate configuration (e.g., 'AL {1, 2, 8, 16}') for TM-specific DCI format (e.g., DCI format 2/2A/2B/2C) transmitted in on a downlink cell. Similarly, when a ratio value of an uplink component carrier (CC) bandwidth and a downlink component carrier (CC) or an uplink component carrier (CC) bandwidth is smaller than a predefined threshold value, or a ratio value of an uplink component carrier (CC) bandwidth and a downlink component carrier (CC) bandwidth or an uplink cell component carrier (CC) bandwidth is equal or less than a predefined threshold value, AL candidate configuration for a specific DCI format (e.g., DCI format 4) for scheduling of uplink data communication may be configured to apply AL candidate configuration for a TM-specific DCI format (e.g., DCI format 2/2A/2B/2C) transmitted on a downlink cell Furthermore, the aforementioned embodiments of the present invention can also be extensively applied to an environment in which an uplink/downlink cell (or CC) bandwidth is applied by combining the aforementioned various embodiments of the present invention.

Furthermore, in the aforementioned embodiments of the present invention, according to whether a ratio value of an uplink cell (or CC) bandwidth and a downlink cell (or CC) bandwidth is greater or equal to a predefined threshold value, one of information about AL candidate configuration for a specific DCI format (transmitted on a downlink (or CC)) followed by AL candidate configuration for a specific DCI format for scheduling of uplink data communication or information about a type of a specific DCI format may be indicated to a UE by an eNB via a predefined signal (e.g., a higher layer or physical layer signal) or may be configured to be determined based on an (pre-shared) implicit rule.

Fourth Embodiment

According to a fourth embodiment of the present invention, when a reconfiguration operation for resource configuration/EPDCCH transmission type/enabling status (e.g., enabled status or disabled status) of a specific EPDCCH set is performed via a predefined higher layer signal (e.g., RRC signaling) in an environment a plurality of EPDCCH sets are configured, an eNB and a UE have difficulty in performing a control information reception operation based on a corresponding EPDCCH set during an ambiguity period based on a higher layer signal or a required time until the reconfiguration operation of the corresponding EPDCCH set is completed, and thus the eNB and the UE may be configured to perform the control information reception operation based on (different) EPDCCH sets for predefined fallback.

Here, when the fourth embodiment of the present invention is applied, a UE may be configured (hereinafter, option #A) to perform a control information reception operation reusing search space (SS) configuration information (e.g., AL configuration or the number of EPDCCH candidates for each AL) configured for a corresponding EPDCCH set for fallback prior to applying a reconfiguration operation of the aforementioned specific EPDCCH set on an EPDCCH set for fallback or the UE may assume that search space (SS) configuration information (e.g., AL configuration or the number of EPDCCH candidates for each AL) of the aforementioned specific EPDCCH set to which a reconfiguration operation is applied according to a additional predefined rule is transited (or reallocated) to an EPDCCH set for fallback and may perform (hereinafter option #B) a control information operation on an EPDCCH set for fallback based on the reallocated search space (SS) configuration information.

In detail, in an environment in which two EPDCCH sets are configured, search space (SS) configuration information for EPDCCH set #0 (i.e., determined as an EPDCCH set for fallback) may be configured according to 'blind decoding candidate {3, 3, 2, 2} for AL {1, 2, 4, 8}' and search space (SS) configuration information for EPDCCH set #1 is configured according to 'blind decoding candidate {3, 3, 0, 0} for AL {1, 2, 4, 8} ', and when EPDCCH set #1 is reconfigured based on a higher layer signal, an eNB and a UE may receive control information based on 'blind decoding candidate {3, 3, 2, 2} for AL {1, 2, 4, 8} (i.e., option #A)' or 'blind decoding candidate {6, 6, 2, 2} for AL {1, 2, 4, 8} (i.e., option #B)' on EPDCCH set #0 for fallback according to a predefined rule.

Furthermore, configuration information about an EPDCCH set for fallback or information about configuration (e.g., option #B) of transition (or reallocation) of search space (SS) configuration information of a specific EPDCCH set to which a reconfiguration operation is applied, to an EPDCCH set for fallback may be indicated to a UE by an eNB via a predefined signal (e.g., a higher layer or physical layer signal) or may be configured to be determined based on an (pre-shared) implicit rule.

In addition, AL candidate for a specific DCI format for scheduling of downlink data communication or a specific DCI format for scheduling of uplink data communication, which is transmitted on a specific EPDCCH set and determined according to the various rules (standards) with regard to the aforementioned embodiments (i.e., first to fourth embodiments) of the present invention may be applied in the form of indicating a lowest configurable AL candidate or indicating a highest AL candidate on a corresponding EPDCCH set or may refer to a predefined number of AL candidates selected based on the aforementioned rule (standard).

In addition, according to the aforementioned embodiments (i.e., the first to fourth embodiments) of the present invention, when an AL candidate set for a specific DCI format for scheduling of downlink data communication or a specific DCI format for scheduling of uplink data communication, which is transmitted on a specific EPDCCH set and determined based on whether threshold values for various parameters are satisfied, is configured to be single or plural (e.g., when AL candidate sets selectable when a threshold value for a specific parameter is satisfied is configured to be plural but not to be single), an eNB may indicate one AL candidate set (for example, which may refer to different AL candidate sets according to whether a threshold value is satisfied even if a signal of the same bit value configuration is received) selected via a predefined signal (e.g., a higher layer or a physical layer signal) to a UE or may be configured to determine one specific AL candidate set based on an (pre-shared) implicit rule.

In the methods proposed by the present invention, as a method for determining a configurable AL candidate on a specific EPDCCH set according to the number of PRB pairs included in a corresponding EPDCCH set, i) a method for allocating a relatively high number of types of ALs or allocating the number of EPDCCH candidates of a higher number of types of ALs as the number of PRB pairs included in a specific EPDCCH set, ii) a method for allocating a relatively high AL or allocating the number of EPDCCH candidates of relatively high ALs as the number of PRB pairs included in a specific EPDCCH set is increased, iii) a method for allocating a relatively high number of EPDCCH candidates of predefined specific candidate aggregation levels as the number of PRB pairs included in a specific EPDCCH set is increased, or iv) a method for increasing a value of a minimum AL allocated to a corresponding EPDCCH set or increasing a value of a maximum AL as the number of PRB pairs included in a specific EPDCCH set is increased may be applied. Here, the applied method may also be applied in the same way to the case in which a configurable AL candidate on a specific EPDCCH set is determined according to one of a system bandwidth, a EPDCCH transmission type of an EPDCCH set, or a type of DCI format transmitted (or monitored by a UE) on the corresponding EPDCCH set.

In addition, according to the present invention, the number of PRB pairs included in a specific EPDCCH set for transmission of distributed EPDCCH (D-EPDCCH) may be always configured to greater or equal to the number of PRB pairs included in a (another) specific EPDCCH set for transmission of localized EPDCCH (L-EPDCCH). That is, according to whether the number of PRB pairs included in a specific EPDCCH set is great or small, restriction may be applied to configuration of an EPDCCH transmission type of the corresponding EPDCCH set. For example, in an environment in which a plurality of EPDCCH sets are configured, a configurable EPDCCH transmission type candidate for a specific EPDCCH set may be limited. In detail, in an environment in which two EPDCCH sets are configured, when the numbers of PRB pairs included in EPDCCH set #0 and EPDCCH set #1 is configured to 4 and 8, respectively and EPDCCH set #1 is configured for L-EPDCCH transmission, a configurable EPDCCH transmission type candidate for EPDCCH set #0 may be limited only to L-EPDCCH according to a method for configuring the number of PRB pairs included in a specific EPDCCH set for transmission of a D-EPDCCH to be always greater or equal to the number of PRB pairs included in another EPDCCH set for transmission of an L-EPDCCH. Furthermore, information about EPDDCH set configuration for transmission of EPDCCH/L-EPDCCH or information about whether the EPDDCH set configuration is applied may be indicated to a UE by an eNB via a predefined signal (e.g., a higher layer or physical layer signal) or may be configured to be determined based on an (pre-shared) implicit rule. In addition, when the aforementioned method is applied, the number of PRB pairs included in a specific EPDCCH set for transmission of a D-EPDCCH is configured to be always greater or equal to the number of PRB pairs included in another EPDCCH set for transmission of an L-EPDCCH, and thus the number of EPDCCH candidates of a relatively high AL may be allocated on a specific EPDCCH set for transmission of a D-EPDCCH based on predefined configuration (e.g., the number of EPDCCH candidates of a relatively high AL is allocated in proportion to the number of PRB pairs included in a specific EPDCCH set).

In addition, in an environment in which a plurality of EPDCCH sets are configured, redivision of (predefined) AL candidates between EPDCCH sets or redivision of the number of EPDCCH candidates for each AL may be configured to be differently determined according to at least one of a EPDCCH transmission type configuration combination of EPDCCH sets on which redivision is performed or a combination of the number of PRB pairs included in EPDCCH sets. As a detailed example, in an environment in which two EPDCCH sets (i.e., EPDCCH set #0 and EPDCCH set #1) are configured, (predefined) AL candidate or EPDCCH candidates for each AL may be configured to be performed between two EPDCCH sets according to a rule of Table 5 below.

'blind decoding candidate {2, 2, 2, 2} for AL {1, 2, 4, 8}' and EPDCCH set #1 is configured as 'blind decoding candidate {4, 4, 0, 0} for AL {1, 2, 4, 8}) may be configured.

When EPDCCH transmission types of EPDCCH set #0 and EPDCCH set #1 are configured as distributed transmission and distributed transmission (or localized transmission and localized transmission), respectively (Case #B), a rule for reallocating a relatively low AL of EPDCCH candidates to EPDCCH set #0 and reallocating a relatively high AL of EPDCCH candidates to EPDCCH set #1 (e.g., EPDCCH set #0 is configured to 'blind decoding candidate {4, 4, 0, 0} for AL {1, 2, 4, 8}' and EPDCCH set #1 is configured to 'blind decoding candidate {2, 2, 2, 2} for AL {1, 2, 4, 8}') may be configured.

Furthermore, a redivision rule of the aforementioned (predefined) AL candidates (or the number of EPDCCH candidates for each AL) or information about whether the corresponding rule is applied may be indicated to a UE by an eNB via a predefined signal (e.g., a higher layer or physical layer signal) or may be configured to be determined based on an (pre-shared) implicit rule.

Furthermore, the aforementioned proposed methods can also be extensively applied to the case in which a combination of the number of PRB pairs included in EPDCCH set

TABLE 5

| | Case #A | |
|---|---|---|
| | EPDCCH transmission type configuration | |
| Type of applied rule | EPDCCH Set #0 Distributed Transmission | EPDCCH Set #1 Localized Transmission |
| Rule #1 for redivision of EPDDCH candidate for each AL (or AL redivision rule #1) | Rule for reconfiguration of EPDCCH candidate of relatively high AL (Rule for reconfiguration of relatively high AL) | Rule for reconfiguration of EPDCCH candidate of relatively low AL (Rule for reconfiguration of relatively low AL) |
| | Case #B | |
| | EPDCCH transmission type configuration | |
| Type of applied rule | EPDCCH Set # Distributed Transmission (or Localized Transmission) | EPDCCH Set #1 Distributed Transmission (or Localized Transmission) |
| Rule #2 for redivision of EPDDCH candidate for each AL (or AL redivision rule #2) | Rule for reconfiguration of EPDCCH candidate of relatively low AL (Rule for reconfiguration of relatively low AL) | Rule for reconfiguration of EPDCCH candidate of relatively high AL (Rule for reconfiguration of relatively high AL) |

Here, it is assumed that the number N_0 of PRB pairs included in EPDCCH set #0 is configured to be greater than the number N_1 of PRB pairs included in EPDCCH set #1. Table 5 above will now be described in detail. When an EPDCCH transmission type of EPDCCH set #0 is configured as distributed transmission and an EPDCCH transmission type of EPDCCH set #1 is configured as localized transmission (Case #A), a rule for reallocating a relatively high AL of EPDCCH candidates to EPDCCH set #0 and reallocating a relatively low AL of EPDCCH candidates to EPDCCH set #1 (e.g., EPDCCH set #0 is configured as

0 and EPDCCH set #1 or a combination of EPDCCH transmission type configuration of EPDCCH set #0 and EPDCCH set #1 is embodied in various forms.

As another proposed method, in an environment in which a plurality of EPDCCH sets are configured, redivision of (predefined) AL candidates between EPDCCH sets or the number of EPDCCH candidates for each AL may be configured to apply different predefined rules according to a combination of EPDCCH transmission type configuration of EPDCCH sets on which redivision is performed.

TABLE 6

| | Case #A | |
|---|---|---|
| | EPDCCH transmission type configuration | |
| Type of applied rule | EPDCCH Set #0 Distributed Transmission | EPDCCH Set #1 Localized Transmission |
| Rule #1 for redivision of AL candidates (the number of EPDCCH candidates for each AL) between EPDCCH sets | The number of EPDCCH candidates of relatively high AL candidates is reallocated on a distributed transmission type of EPDCCH set and the number of relatively low AL candidates is reallocated on a localized transmission type of EPDCCH set | |
| | Case #B | |
| | EPDCCH transmission type configuration | |
| Type of applied rule | EPDCCH Set # Distributed Transmission (or Localized Transmission) | EPDCCH Set #1 Distributed Transmission (or Localized Transmission) |
| Rule #2 for redivision of AL candidates (the number of EPDCCH candidates for each AL) between EPDCCH sets | Rule for allocating the number of EPDCCH candidates of relatively high AL candidates on EPDCCH set included in a relatively high number of PRB pairs (or the relatively high number of EPDCCH candidates) | |

In detail, in an environment in which two EPDCCH sets (i.e., EPDCCH set #0 and EPDCCH set #1) are configured, redivision of (predefined) AL candidates between two EPDCCH sets or EPDCCH candidates for each AL may be configured to be performed based on the rule of Table 6 above. In Table 6 above, it is assumed that the number N_0 of PRB pairs included in EPDCCH set #0 is configured to be greater than the number N_1 of PRB pairs included in EPDCCH set #1.

In detail, according to Table 6 above, when EPDCCH transmission types of EPDCCH set #0 and EPDCCH set #1 are differently configured (e.g., {EPDCCH set #0, EPDCCH set #1}={Distributed Transmission, Localized Transmission}) (i.e., Case #A), a rule for reallocating the numbers of EPDCCH candidates of relatively high AL candidates on a distributed transmission type of EPDCCH set and reallocating the numbers of EPDCCH candidates of relatively low AL candidates on a localized transmission type of EPDCCH set (e.g., distributed EPDCCH set #0 is configured according to 'blind decoding candidate {2, 2, 2, 2} for AL {1, 2, 4, 8}' and localized EPDCCH set #1 is configured according to 'blind decoding candidate {4, 4, 0, 0} for AL {1, 2, 4, 8}') may be configured.

As another example, when EPDCCH transmission types of EPDCCH set #0 and EPDCCH set #1 are configured to be the same (e.g., {EPDCCH set #0, EPDCCH set #1}={localized transmission, localized transmission} or {distributed transmission, distributed transmission}) (i.e., Case #B), a rule for allocating the number of EPDCCH candidates of relatively high AL candidates or the number of relatively high EPDCCH candidates on an EPDCCH set included n a relatively high number of PRB pairs (e.g., EPDCCH set #0 is configured according to 'blind decoding candidate {1, 1, 2, 2} for AL {1, 2, 4, 8}' and EPDCCH set #1 is configured according to 'blind decoding candidate {5, 5, 0, 0} for AL {1, 2, 4, 8}') may be configured. Furthermore, a rule for redivision of the number of (predefined) AL candidates for each EPDCCH transmission type configuration combination of the aforementioned EPDCCH sets or the numbers of EPDCCH candidates for respective ALs for each EPDCCH transmission type configuration combination of EPDCCH sets, or information about whether a rule for each EPDCCH transmission type configuration combination of EPDCCH sets is applied may be indicated to a UE by an eNB via a predefined signal (e.g., a higher layer or physical layer signal) or may be configured to be determined based on an (pre-shared) implicit rule. In addition, the aforementioned embodiments of the present invention can also be extensively applied to the case in which a combination of the numbers of PRB pairs included in EPDCCH set #0 and EPDCCH set #1 or a combination of EPDCCH transmission type configurations of EPDCCH set #0 and EPDCCH set #1 is embodied in various forms.

According to another embodiment of the present invention, in an environment in which a plurality of EPDCCH sets are configured, redivision of (predefined) AL candidate (or the number of EPDCCH candidates for each AL) between EPDCCH sets may be configured to apply different predefined rules according to an EPDCCH transmission type configuration combination of EPDCCH sets on which redivision is performed.

TABLE 7

| | Case #A | |
|---|---|---|
| | EPDCCH transmission type configuration | |
| Type of applied rule | EPDCCH Set #0 Distributed Transmission | EPDCCH Set #1 Localized Transmission |
| Rule #1 for redivision of AL candidates (or the number of | Operation for partitioning BD EPDCCH candidates in terms of AL. That is, a rule for allocating only the number of | |

TABLE 7-continued

| EPDCCH candidates for each AL) between EPDCCH sets | EPDCCH candidates of relatively high predefined AL candidates on a distributed transmission type of EPDCCH set and allocating only the number of EPDCCH candidates of relatively low AL candidates on a localized transmission type of EPDCCH set is applied (in particular, when a specific AL candidate is present in one side EPDCCH set, the same AL candidate is not present in the other EPDCCH set). |
|---|---|

Case #B

EPDCCH transmission type configuration

| Type of applied rule | EPDCCH Set # Distributed Transmission (or Localized Transmission) | EPDCCH Set #1 Distributed Transmission (or Localized Transmission) |
|---|---|---|
| Rule #2 for redivision of AL candidates (or the number of EPDCCH candidates for each AL) between EPDCCH sets | Operation for uniformly partitioning BD EPDCCH candidates in all ALs. That is, a rule for applying an equal division method or an unequal division method for the number of PEDCCH candidates for each AL in order to divide EPDCCH candidates of (predefined) AL candidates between different EPDCCH sets is applied (e.g., a rule for allocating the numbers (or the numbers of relatively high EPDCCH candidates) of EPDCCH candidates of relatively high AL candidates on an EPDCCH set including a relatively high number of PRB pairs) (in particular, even if a specific AL candidate is present in one side EPDCCH set, when a number of blind decoding (BD) times for corresponding AL is sufficient, different candidates of the same AL are present in another EPDCCH set.). | |

For example, in Table 7 above, in an environment in which two EPDCCH sets (i.e., EPDCCH set #0 and EPDCCH set #1) are configured, when EPDCCH transmission types of EPDCCH set #0 and EPDCCH set #1 are differently configured (e.g., {EPDCCH set #0, EPDCCH set #1}={distributed transmission, localized transmission}) (i.e., Case #A of Table 7), EPDCCH candidate for blind decoding (BD EPDCCH candidate) is configured to be divided in terms of an AL. That is, a rule for allocating only the number of EPDCCH candidates of relatively high predefined AL candidates on a distributed transmission type of EPDCCH set and allocating only the number of EPDCCH candidates of relatively low predefined AL candidates on a localized transmission type of EPDCCH set is applied. Thus, when a specific AL of candidate is present in one specific EPDCCH, the same AL of candidate is not present in another EPDCCH set. Accordingly, when the number N_0 of PRB pairs included in EPDCCH set #0 is configured to be greater than the number N_1 of PRB pairs included in EPDCCH set #1 and EPDCCH set #0 and EPDCCH set #1 are configured as a distributed transmission type and a localized transmission type, respectively, distributed EPDCCH set #0 may be configured according to 'blind decoding candidate {0, 0, 2, 2} for AL {1, 2, 4, 8}' and localized EPDCCH set #1 may be configured according to 'blind decoding candidate {6, 6, 0, 0} for AL {1, 2, 4, 8}'.

In addition, like in Case #B of Table 7, when EPDCCH transmission types of EPDCCH set #0 and EPDCCH set #1 are configured to be the same (e.g., {EPDCCH set #0, EPDCCH set #1}={localized transmission, localized transmission} or {distributed transmission, distributed transmission}), EPDCCH candidate for blind decoding (BD EPDCCH candidate) may be configured to be uniformly divided in all ALs. Accordingly, in order to divide EPDCCH candidates of (predefined) AL candidates between different EPDCCH sets, an equal division method or an unequal division method may be applied with respect to the number of EPDCCH candidates for each AL. (For example, the number of EPDCCH candidate of relatively high AL candidates or the number of relatively high EPDCCH candidates may be configured to be allocated on an EPDCCH set including a relatively large number of PRB pairs.) In this case, distinctively, even if a candidate of a specific AL is present in one specific EPDCCH set, when a number of blinding decoding (BD) times for a corresponding AL is sufficient, another candidate of the same AL is present in another EPDCCH set.

In this case, when the number N_0 of PRB pairs included in EPDCCH set #0 is configured to be greater than the number N_1 of PRB pairs included in EPDCCH set #1 and EPDCCH set #0 and EPDCCH set #1 are configured as a distributed transmission type and a localized transmission type (or a localized transmission type and a distributed transmission type), respectively, EPDCCH set #0 may be configured according to 'blind decoding candidate {4, 4, 1, 1} for AL {1, 2, 4, 8}' and EPDCCH set #1 may be configured according to 'blind decoding candidate BD {2, 2, 1, 1} for AL {1, 2, 4, 8}'. Furthermore, a redivision rule of (predefined) AL candidates for each EPDCCH transmission type configuration combination of the aforementioned EPDCCH sets or a plurality of pieces of information about whether the corresponding rule is applied may be indicated to a UE by an eNB via a predefined signal (e.g., a higher layer or physical layer signal) or may be configured to be determined based on an (pre-shared) implicit rule. In addition, the aforementioned method can also be extensively applied to the case in which a combination of the number of PRB pairs included in EPDCCH set #0 and EPDCCH set #1 or a combination of EPDCCH transmission type configuration of EPDCCH set #0 and EPDCCH set #1 are applied in various forms.

When EPDCCH transmission types of EPDCCH set #0 and EPDCCH set #1 are configured to be the same (e.g., Case #B of Table 7), an operation for equally dividing (i.e., equal dividing) EPDCCH candidate for blind decoding (BD EPDCCH candidate) in all ALs or an unequal division method may be configured to be restrictively applied only to the case in which corresponding EPDCCH sets are configured in a combination of predefined specific EPDCCH transmission types. Here, as an example of the unequal division method, the large numbers of EPDCCH candidates of specific (or all) ALs, the numbers of EPDCCH candidates of a relatively high AL, or the number of all EPDCCH candidates may be reallocated on an EPDCCH set including a relatively large number of PRB pairs. Accordingly, a rule for redividing the number of (predefined) EPDCCH candidates for each AL between corresponding EPDCCH sets may be applied using the unequal division method (i.e., a method for reallocating the large numbers of EPDCCH candidates of specific (or all) ALs, the large numbers of EPDCCH candidates of a high AL, or the large number of all EPDCCH candidates on an EPDCCH set including a relatively large number of PRB pairs) only when EPDCCH set #0 and EPDCCH set #1 are configured to be the same as distributed transmission type.

Furthermore, in further consideration of at least one of parameters (or parameter combinations) related to a system bandwidth (e.g., whether a predefined system bandwidth threshold value is satisfied), a DCI format type (e.g., DCI format 0/1A or DCI format 2/2C), whether a threshold value of available resource elements (REs) for EPDCCH transmission is satisfied on one predefined PRB pair, the number (e.g., cases in which one ECCE includes four or eight EREGs) of EREGs (or REs) included in a specific ECCE, or whether configurations of PRB pairs between EPDCCH sets are the same or different, whether equal/unequal division methods are configured to be restrictedly applied only when a specific EPDCCH transmission type combination is configured.

As another example, in the aforementioned embodiment, when EPDCCH transmission types of EPDCCH set #0 and EPDCCH set #1 are configured to be different (e.g., Case #A of Table 7), a rule for redividing EPDCCH candidate for blind decoding (BD EPDCCH candidate) in terms of AL (e.g., a rule in which, when a candidate of a specific AL is present in one specific EPDCCH set, a candidate of the same AL is not present in another EPDCCH) may be configured to be restrictedly applied according to whether the numbers of PRB pairs of corresponding EPDCCH sets are the same. For example, in an environment in which EPDCCH transmission types of EPDCCH set #0 and EPDCCH set #1 are differently configured (e.g., {EPDCCH set #0, EPDCCH set #1}={distributed transmission, localized transmission}), a rule (e.g., a rule for allocating only the number of EPDCCH candidates of relatively high AL candidates on a distributed transmission type EPDCCH set and allocating only the number of EPDCCH candidates of relatively predefined low AL candidate on a localized transmission type AL candidates). Alternatively, a rule (i.e., only the numbers of EPDCCH candidates of relatively high predefined AL candidates are allocated on a distributed transmission type EPDCCH set and only the numbers of EPDCCH candidates of relatively low predefined AL candidates are allocated on a localized transmission type EPDCCH set) for redividing BD EPDCCH candidate in terms of an AL only when the numbers of PRB pairs of corresponding EPDCCH sets are configured to be the same. Furthermore, whether this method is applied may be configured to be determined in further consideration of at least one of parameters (or parameter combinations) related to a system bandwidth (e.g., whether a predefined system bandwidth threshold value is satisfied), a DCI format type (e.g., DCI format 0/1A or DCI format 2/2C), whether a threshold value of available resource elements (REs) for EPDCCH transmission is satisfied on one predefined PRB pair, or the number (e.g., cases in which one ECCE includes four or eight EREGs) of EREGs (or REs) included in a specific ECCE.

In addition, in an environment in which a plurality of EPDCCH sets are configured, (predefined) AL candidates between EPDCCH sets or the numbers of EPDCCH candidates for each AL may be reallocated by reallocating a relatively high number of EPDCCH candidates as the number of PRB pairs included in a specific EPDCCH set is reduced. For example, the number of EPDCCH candidates reallocated to a specific EPDCCH set including a relatively small number of PRB pairs may be configured with EPDCCH candidates of a relatively low AL or EPDCCH candidates of a specific candidate AL according to a predefined rule. In the aforementioned method, a relatively small number of ECCEs (that can be used as EPDCCH candidate) are present in a specific EPDCCH set including a relatively small number of PRB pairs, and thus a relatively large number of EPDCCH candidates may be reallocated on a corresponding EPDCCH set to reduce (or avoid) probability that a blocking even occurs if possible. That is, even if some EPDCCH candidates based on a specific AL are blocked, the probability that the remaining EPDCCH candidates based on the corresponding AL are not blocked may be relatively increased. On the other hand, a relatively large number of ECCEs (that can be used as EPDCCH candidate) are present in a specific EPDCCH set including a relatively large number of PRB pairs, and thus even if a relatively small number of EPDCCH candidates may be reallocated on a corresponding EPDCCH set, the probability that the corresponding EPDCCH candidates are blocked may not be high.

In detail, in an environment in which two EPDCCH sets are configured, when EPDCCH set #0 and EPDCCH set #1 include eight and four PRB pairs, respectively, EPDCCH set #0 may be configured according to 'blind decoding candidate {1, 1, 2, 2} for AL {1, 2, 4, 8}' and EPDCCH set #1 may be configured according to 'blind decoding candidate {5, 5, 0, 0} for AL {1, 2, 4, 8}. That is, as the number of PRB pairs included in a specific EPDCCH set is reduced, (more) EPDCCH candidates of relatively low ALs may be reallocated. Furthermore, the aforementioned method (as the number of PRB pairs included in a specific EPDCCH set is reduced, a relatively high number of EPDCCH candidates are reallocated) may be limited to the case in which a plurality of EPDCCH sets are configured with the same EPDCCH transmission type, limited to the case in which a plurality of EPDCCH sets are configured with different EPDCCH transmission types, limited to the case in which a specific EPDCCH set (including a relatively small number of PRB pairs) is configured with a specific predefined EPDCCH transmission type or the case in which DCI formats monitored by a UE on a plurality of EPDCCH sets are the same, limited to the case in which DCI formats monitored by a UE on a plurality of EPDCCH sets are different, or limited to the case in which a UE monitors a specific predefined DCI format on a specific EPDCCH set (including a relatively small number of PRB pairs), the case in which a system bandwidth is greater or equal to a predefined specific threshold value, or the case in which a system bandwidth is equal or smaller than a predefined specific threshold value.

According to another embodiment of the present invention, in an environment in which a plurality of EPDCCH sets are configured, the number of (predefined) AL candidates between EPDCCH sets or the number of EPDCCH candidates for each AL may be configured to select one of a plurality of predefined redivision rules according to at least one combination of a system bandwidth, a configuration combination of the number K_D of EPDCCH sets based on distributed transmission and the number K_L of EPDCCH sets based on localized transmission, a configuration combination of PRB pairs included in each EPDCCH set, a DCI format type (monitored by a UE) (e.g., TM-dependent DCI format or DCI format 1A/0), or information about a configurable minimum AL on an EPDCCH set. Here, the configurable minimum AL on an EPDCCH set may be configured as 1 when the number of available REs for EPDCCH transmission on one PRB pair is greater or equal to a predefined threshold value $X_{\_th}$, and in an opposite case (i.e., the number is smaller than the predefined threshold value $X_{\_th}$), the configurable minimum AL may be configured as 2 in the case of, for example, a predefined specific subframe type, i.e., normal subframe (Normal CP) or special subframe (special subframe configurations #3, #4, and #8 (Normal CP)).

TABLE 8

| System bandwidth | N-0 | N-1 | When Minimum AL is 1 | | When Minimum AL is 2 | |
|---|---|---|---|---|---|---|
| | | | DCI format 1A/0 | TM-dependent DCI format | DCI format 1A/0 | TM-dependent DCI format |
| when being greater than $BW_{\_th}$ | 8 | 8 | Config. #0 | Config. #6 | Config. #12 | Config. #18 |
| | 8 | 4 | Config. #1 | Config. #7 | Config. #13 | Config. #19 |
| | 4 | 4 | Config. #2 | Config. #8 | Config. #14 | Config. #20 |
| when being smaller than $BW_{\_th}$ | 4 | 4 | Config. #3 | Config. #9 | Config. #15 | Config. #21 |
| | 4 | 2 | Config. #4 | Config. #10 | Config. #16 | Config. #22 |
| | 2 | 2 | Config. #5 | Config. #11 | Config. #17 | Config. #23 |

For example, in an environment in which two EPDCCH sets (i.e., EPDCCH set #0 and EPDCCH set #1) are configured, as shown in Table 8, a rule selected to redivide (predefined) AL candidate (or the number of EPDCCH candidates for each AL) between EPDCCH sets may be configured. Here, the numbers of PRB pairs included in EPDCCH set #0 and EPDCCH set #1 are assumed to be N0 and N_1, respectively, and a threshold value of a p redefined system bandwidth is assumed to $BW_{\_th}$ (e.g., 25 RBs). In Table 8, configuration #X refers to 'blind decoding candidate {a2, b2, c2, d2, e2} for AL {a1, b1, c1, d1, e1} (i.e., EPDCCH set #0)' and 'blind decoding candidate {a3, b3, c3, d3, e3} for AL {a1, b1, c1, d1, e1} (i.e., EPDCCH set #1)' for predefined EPDCCH set #0 and EPDCCH set #1 (selected in a combination of pieces of information).

As a detailed embodiment of the present invention, configuration of the number of EPDCCH candidates for a specific AL may be differently applied based on a combination of information related to a configurable minimum AL value on an EPDCCH set or a DCI format type (monitored by a UE). For example, in Table 8, in the case of Configuration #0 and Configuration #12 for DCI format 1A/0, when the number of EPDCCH candidates for AL 2 is (commonly) configured, the number of EPDCCH candidates for AL 2 of Configuration #0 may be configured to be greater than the number of EPDCCH candidates for AL 2 of Configuration #16. For example, Configuration #0 may be configured according to 'blind decoding candidate {3, 3, 1, 1, 0} for AL {1, 2, 4, 8, 16} (i.e., EPDCCH set #0)' and 'blind decoding candidate {3, 3, 1, 1, 0} for AL {1, 2, 4, 8, 16} (i.e., EPDCCH set #1)' such that Configuration #0 is configured with a total number of 6 EPDCCH candidates for AL 2, and Configuration #16 may be configured according to 'blind decoding candidate {0, 1, 3, 3, 1} for AL {1, 2, 4, 8, 16} (i.e., EPDCCH set #0)' and 'blind decoding candidate {0, 1, 3, 3, 1} for AL {1, 2, 4, 8, 16} (i.e., EPDCCH set #1)' such that Configuration #16 is configured with a total number of 2 of EPDCCH candidates for AL 2. In addition, in the case of Configuration #6 and Configuration #18 for TM-dependent DCI format, when the number of EPDCCH candidates for AL 2 is (commonly) configured, a different configuration (or rule) from the aforementioned case of DCI format 1A/0 may be defined. Furthermore, information about a configuration condition of information for differently applying the aforementioned rule for setting the number of EPDCCH candidates for a specific AL or a configuration condition of information for selection of one of a plurality of predefined redivision rules may be indicated to a UE by an eNB via a predefined signal (e.g., a higher layer or physical layer signal) or may be configured to be determined based on an (pre-shared) implicit rule.

According to the aforementioned embodiments of the present invention, AL candidates for a specific DCI format for scheduling of downlink/uplink data communication transmitted on a specific EPDCCH set may be differently configured according to at least one information combination of information of a combination of the numbers of PRB pairs included in respective corresponding EPDCCH sets, system bandwidth information, information of a combination of EPDCCH transmission types of respective corresponding EPDCCH sets (e.g., localized or distributed EPDCCH (set)), information of a type of a specific DCI format, or information of a combination of specific DCI format types for scheduling of downlink/uplink data communication monitored by a UE on respective corresponding EPDCCH sets in a situation in which at least one EPDCCH set (from an eNB) is configured. Furthermore, information about this operation may also be indicated to a UE by an eNB via a predefined signal (e.g., a higher layer or physical layer signal) or may be configured to be determined based on an (pre-shared) implicit rule.

In addition, minimum AL configuration supported on a corresponding EPDCCH set may be differently defined according to the number of PRB pairs included in a specific EPDCCH set. In this case, in a relatively small system bandwidth environment, a payload size of a specific DCI format is configured with a relatively small value, and thus it may be relatively possible to transmit reliable control information of a low cording rate with AL 1. On other hand, in a relatively large system bandwidth environment, a payload size of a specific DCI format is configured with a relatively large value, and thus it may be relatively difficult to transmit reliable control information of a low cording rate with AL 1. Accordingly, in a relatively small system bandwidth environment, a payload size of a specific DCI format is configured with a relatively small value and it is possible to transmit reliable control information of a low cording rate with AL 1, and thus the number of PRB pairs included in a specific EPDCCH set may be inevitably configured to be high. In consideration of this feature, when the number of PRB pairs included in a specific EPDCCH set is signaled (configured), corresponding signaling may be determined as implicit signaling (or configuration) indicating a relatively small system bandwidth environment.

Similarly, according to the number of PRB pairs included a specific EPDCCH set of the aforementioned method, minimum AL configuration supported on the corresponding EPDCCH set may be configured to be differently defined. For example, the number of PRB pairs included a specific EPDCCH set is signaled as a small value (compared with a predefined threshold value), a corresponding system may be considered as a relatively small system bandwidth, and minimum AL configuration may be configured to be considered (configured) as 1. On the other hand, when the number of PRB pairs included a specific EPDCCH set is signaled as a large value (compared with a predefined threshold value), a corresponding system may be considered as a relatively large, and a rule for considering (or configuring) minimum AL configuration as 2. In detail, under a situation in which predefined AL candidate configuration is AL {a, b, c, d, e} (e.g., AL {1, 2, 4, 8, 16}), when the number of PRB pairs included a specific EPDCCH set is configured as 2 (e.g., considered as a system of a relatively small value of bandwidth), a minimum AL is configured as 1 and (re)allocation of a number of blind decoding (BD) times may be assumed to be 'blind decoding candidate {6, 6, 2, 2, 0} for AL {a, b, c, d, e}' according to the aforementioned proposed method. On the other hand, when the number of PRB pairs included a specific EPDCCH set is configured as 4 or more (e.g., considered as a system of a relatively high value of bandwidth), a minimum AL is configured as 2 and (re)allocation of a number of blind decoding (BD) times may be assumed to be 'blind decoding candidate {0, 6, 6, 2, 2} for AL {a, b, c, d, e}'.

Here, whether a method for applying a method for differently configuring minimum AL configuration supported on a corresponding EPDCCH set according to the number of PRB pairs included a specific EPDCCH set is applied may be differently defined according to at least one of parameters (or combinations of parameters) of an EPDCCH transmission type (e.g., localized EPDCCH or distributed EPDCCH) of a specific EPDCCH set, a system bandwidth size (e.g., whether a bandwidth of a system for transmitting a corresponding EPDCCH set satisfies a threshold value of a predefined bandwidth), a DCI format type (e.g., DCI Format 0/1A or Format 2/2A/2B/2C), the number of configured EPDCCH sets (e.g., the number of configured EPDCCH sets in terms of a specific terminal), the number of EREGs included in a specific ECCE (e.g., whether the method is applied may be differently configured according to the case in which one ECCE includes 4 or 8 EREGs), the number of resource elements (REs) included in a specific ECCE (e.g., interpreted as a coding rate of a specific ECCE), whether the number of available REs for EPDCCH on one specific PRB pair satisfies a predefined threshold value (i.e., $X_{\_th}$), a subframe type (or CP type) (e.g., Normal SF/Special SF/Normal CP/Extended CP), or a system type (e.g., an FDD or TDD system). In addition, it is obvious that the above listed plurality of parameters (combinations of some parameters) may be considered as other parameters considered to be differently define minimum AL configuration supported on a specific EPDCCH set according to the aforementioned method.

In addition, according to the rule for differently defining minimum AL configuration supported by an EPDCCH transmission type (e.g., localized EPDCCH or distributed EPDCCH) of a specific EPDCCH set, a localized EPDCCH requires relatively stable channel state information (CSI) compared with a distributed EPDCCH, and thus the corresponding localized EPDCCH is likely to be used for terminals of a relatively high SINR, and a minimum AL may be configured with a relatively small value compared with a distributed EPDCCH for a terminal of a relatively high SINR, in which the localized EPDCCH is used.

In addition, according to the rule for differently defining minimum AL configuration supported by a system bandwidth, as a system bandwidth is increased, a payload size of a specific DCI format is increased, and a relatively high AL may be required for reliable transmission of the corresponding DCI format.

In addition, as a system bandwidth is smaller, the number of PRB pairs included in a specific EPDCCH set is likely to be a smaller value in consideration of the number (i.e., control channel overhead) of available PRB pairs for PDSCH transmission, and in this case, a relatively low value of minimum AL may be configured to maintain multiplexing capacity of the corresponding EPDCCH to an appropriate level.

In addition, according to the rule for differently defining minimum AL configuration supported by a system bandwidth, a specific DCI format (e.g., DCI format 2/2A/2B/2C) requires a relatively high payload size compared with another DCI format (e.g., DCI format 0/1A) (or increase in a payload size increased according to system bandwidth increase is high), and thus a relatively high value of minimum AL may be configured for the corresponding DCI format (e.g., DCI format 2/2A/2B/2C).

In addition, according to the rule for differently defining minimum AL configuration supported by the number of EREGs included in a specific ECCE (or the number of REs included in a specific ECCE), as the number of EREGs (or REs) included in a specific ECCE is configured to be large, a coding rate of the corresponding ECCE is likely to be maintained to be low, and thus, in this case, a minimum AL supported on a specific EPDCCH set may be configured to be low.

In addition, the rule for differently defining minimum AL configuration supported according to whether the number of available REs for EPDCCH transmission on one specific PRB pairs satisfies a predefined threshold value (i.e., $X_{\_th}$) may be differently configured according to whether the number of REs included in a specific ECCE satisfies the corresponding threshold value (i.e., $X_{\_th}$), and thus when the number of available REs for EPDCCH transmission on one specific PRB pairs does not satisfy a predefined threshold value, this means that the number of REs included in a specific ECCE is not sufficient (i.e., a high coding rate), and thus a relatively high value of minimum AL may be configured.

Similarly, according to another embodiment of the present invention, according to the rule for differently defining minimum AL configuration supported by a subframe type, the number of available REs for EPDCCH transmission on one specific PRB pairs is differently defined according to a subframe type, and thus the number (e.g., one ECCE includes 4 or 8 EREGs) of EREGs (or REs) included in a specific ECCE may be differently defined. For example, a rule for configuring one ECCE with 8 EREGs in special SF Configurations #1, 2, 6, 7, and 9 or a normal subframe and configuring a minimum AL with a relatively small value in the corresponding subframe type may be defined. Needless to say, similarly, according to the rule for differently defining minimum AL configuration supported by a CP type, the number of available REs for EPDCCH transmission on one specific PRB pairs may be differently defined according to a CP type, and thus the number of EREGs (or REs) included in a specific ECCE may be differently defined, and in the case of normal CP or extended CP, a rule for configuring one ECCE with 8 EREGs and configuring a minimum AL with a relatively small value under the corresponding CP type may be defined. For example, when the number of PRB pairs included in a specific EPDCCH set is configured as 4 (or 2), minimum AL configuration supported on the corresponding EPDCCH set may be configured as 1, and on the other hand, when the number of PRB pairs included in a specific EPDCCH set is configured as 8, minimum AL configuration supported on the corresponding EPDCCH set may be configured as 2.

According to another embodiment of the present invention, as a method for differently defining minimum AL configuration supported on a corresponding EPDCCH set according to the number of PRB pairs included in a specific EPDCCH set, when a specific EPDCCH set is configured with predefined threshold value or more of PRB pairs, the maximum number of supportable blind decoding (BD) may be preferentially allocated to corresponding AL X from a (predefined) specific AL X on a corresponding EPDCCH set, and then the maximum number of supportable blind decoding (BD) may be allocated while being sequentially moved to next high ALs. Here, the maximum number of supportable blind decoding (BD) to a specific AL may refer to allocation of the maximum number of available blind decoding (BD) as long as "specific AL value X the number of blind decoding (BD) allocated to corresponding AL" does not exceed the number of all ECCEs included in a specific EPDCCH set.

According to another embodiment of the present invention, information about a threshold value (i.e., minimum AL configuration is differently applied according to whether the number of PRB pairs included in the corresponding EPDCCH set satisfies the corresponding threshold value) for differently applying minimum AL configuration supported on a specific EPDCCH set of the aforementioned embodiment of the present invention according to the number of PRB pairs included in the corresponding EPDCCH set may be implicitly considered by a UE based on a predefined rule or may be indicated by an eNB via a predefined signal (e.g., a higher layer or physical layer signal). Furthermore, in the aforementioned method, maximum AL configuration supported on the corresponding EPDCCH set may be differently defined according to the number of PRB pairs included in a specific EPDCCH set, and the same method as the aforementioned method may be applied.

In a specific subframe (SF) type or a cyclic prefix (CP) type environment, a minimum AL may be differently defined according to whether the number of REs included in one PRB pair satisfies a predefined threshold value (i.e., $X_{\_th}$). According to the this operation, the number of REs included in a specific ECCE is changed according to whether the number of REs included in one PRB pair satisfies a predefined threshold value (i.e., $X_{\_th}$), and thus, for example, when a corresponding threshold value (i.e., $X_{\_th}$) is satisfied, the number of REs included in a specific ECCE may be considered to be relatively sufficient (i.e., it may be possible to transmit reliable control information with relatively low coding rate). However, a payload size of DCI formats is changed by a system bandwidth, and thus a method for defining a minimum AL based on a fixed threshold value (i.e., $X_{\_th}$) irrespective system bandwidth may be irrational.

For example, in a system environment of 20 Mz, in consideration of 'the case in which DM-RS overhead of 24 REs/Normal SF (Normal CP)/QPSK/one specific ECCE includes 4 EREGs', a coding rate of transmission of DCI format 2C (i.e., 66 bits) based on AL 1 may be 0.92. On the other hand, in a system environment of 1.4 Mz, in consideration of 'the case in which DM-RS overhead of 24 REs/Normal SF (Normal CP)/QPSK/one specific ECCE includes 4 EREGs', a coding rate of transmission of DCI format 2C (i.e., 46 bits) based on AL 1 may be 0.64.

That is, in the former example (i.e., coding rate of 0.92), compared with the latter case (i.e., coding rate of 0.64), a relatively high threshold value (i.e., $X_{\_th}$) may be configured to transmit minimum AL 2-based control information (not AL 1), thereby ensuring successful transmission of control information. Accordingly, instead of a method for defining a minimum AL based on one fixed threshold value (i.e., $X_{\_th}$), the corresponding threshold value (i.e., $X_{\_th}$) may be configured to be changed (based on a predefined rule or an implicit rule) according to a specific parameter that implicitly indicates a system bandwidth or a system bandwidth size. In this case, a rule may be defined to change the threshold value (i.e., $X_{\_th}$) based on configuration of the number of PRB pairs included in a specific EPDCCH set. Here, in a relatively small system bandwidth environment, a payload size of a specific DCI format is configured with a relatively small value and it is possible to transmit reliable control information of a low coding rate with AL 1, and thus, the number of PRB pairs included in a specific EPDCCH set is inevitably configured to be high.

Thus, in consideration of this feature, when the number of PRB pairs included in a specific EPDCCH set is signaled (or configured) with a small value, the corresponding signaling may be interpreted as implicit signaling (or configuration) indicating a relatively small system bandwidth environment, and the threshold value (i.e., $X_{\_th}$) may be configured to be changed based on configuration (or signaling) for the number of PRB pairs included in a specific EPDCCH set. In detail, when the number of PRB pairs included in a specific EPDCCH set is configured as 2 (e.g., considered as a system of a relatively small number of bandwidth), the corresponding threshold value (i.e., $X_{\_th}$) may be configured to be assumed to be 104, and on the other hand, when the number of PRB pairs included in a specific EPDCCH set is configured as 4 (or 8) (e.g., considered as a system of a relatively high number of bandwidth), the corresponding threshold value (i.e., $X_{\_th}$) may be configured to be assumed to be a value greater than 104 (e.g., 108).

According to another embodiment of the present invention, in the proposed method, when the number of PRB pairs, the number of which is greater or equal to a reference value for differently applying the corresponding threshold value (i.e., $X_{\_th}$) according to the number of PRB pairs included in a specific EPDCCH, for example, a predefined reference value is configured (or signaled) for the specific EPDCCH set (i.e., considered as a system of a relatively high value of bandwidth), information about whether the changed threshold value (i.e., $X_{\_th}$) is assumed to be applied may be implicitly recognized by a UE based on a predefined rule or may be indicated by an eNB via a predefined signal (e.g., a higher layer or physical layer signal). Furthermore, a rule for changing the threshold value (i.e., $X_{\_th}$) based on configuration (or signaling) of the number of PRB pairs included in a specific EPDCCH set may be defined, a threshold value configured through this rule may be interpreted to limit a maximum AL instead of a minimum AL, and the same method as the aforementioned method may be applied.

Figure 12:
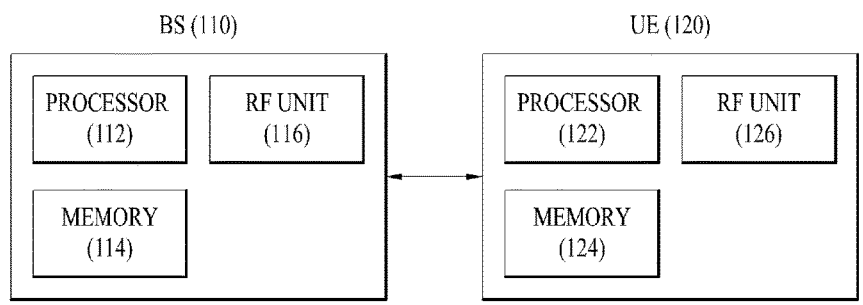
FIG. 12 is a diagram illustrating a BS and a UE which are applicable to an embodiment of the present invention.

FIG. 12 is a diagram illustrating a BS 110 and a UE 120 which are applicable to an embodiment of the present invention. When a relay is included in a wireless communication system, communication in backhaul link is performed between the BS and the relay and communication in access link is performed between the relay and the UE. Thus, the BS 110 or the UE 120 may be replaced with a relay according to a situation.

The aforementioned various embodiments of the present invention may be independently implemented, but as necessary, some of at least one of the embodiments of the present invention may be combined and implemented and even if all of the embodiments of the present invention may be combined and implemented, it is obvious that these are included in the scope of the technical solutions proposed by the present invention.

Referring to FIG. 12, a wireless communication system includes the BS 110 and the UE 120. The BS 110 includes a processor 112, a memory 114, and a radio frequency (RF) unit 116. The processor 112 may be configured to embody the procedures and/or methods proposed by the present invention. The memory 114 is connected to the processor 112 and stores various pieces of information associated with an operation of the processor 112. The RF unit 116 is connected to the processor 112 and transmits and/or receives a radio signal. The UE 120 includes a processor 122, a memory 124, and an RF unit 126. The processor 122 may be configured to embody the procedures and/or methods proposed by the present invention. The memory 124 is connected to the processor 122 and stores various pieces of information associated with an operation of the processor 122. The RF unit 126 is connected to the processor 122 and transmits and/or receives a radio signal. The BS 110 and/or the UE 120 may have a single antenna or a multiple antenna.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

The embodiments of the present invention may be achieved by various means, for example, hardware, firmware, software, or a combination thereof. In a hardware configuration, an embodiment of the present invention may be achieved by one or more application specific integrated circuits (ASICs), digital signal processors (DSPs), digital signal processing devices (DSDPs), programmable logic devices (PLDs), field programmable gate arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

Although an example of applying a method and apparatus for receiving control information in a wireless communication system to a $3^{rd}$ generation partnership project (3GPP) long term evolution (LTE) system has been described, the present invention is applicable to various wireless communication systems in addition to the 3GPP LTE system.

The invention claimed is:

1. A method for receiving control information by a user equipment (UE) in a wireless communication system, the method comprising:
    receiving, from a base station via higher layer signaling, an enhanced physical downlink control channel (EPDCCH) configuration including a transmission type associated with an EPDCCH, a ratio value of an uplink cell bandwidth and a downlink cell bandwidth and a number of physical resource block (PRB) pairs associated with the EPDCCH,
    wherein the transmission type associated with the EPDCCH indicates whether a distributed EPDCCH transmission or a localized EPDCCH transmission is used; and
    monitoring EPDCCH candidates according to an aggregation level for monitoring the EPDCCH to receive the control information,
    wherein the aggregation level is determined based on a downlink control information (DCI) format and the number of PRB pairs associated with the EPDCCH according to the transmission type associated with the EPDCCH, and
    wherein the UE determines whether an aggregation level candidate configuration for a uplink data scheduling DCI format is applied as an aggregation level candidate configuration for a specific DCI format transmitted in a downlink cell by comparing a predefined threshold value with the ratio value of the uplink cell bandwidth and the downlink cell bandwidth.

2. The method according to claim 1, wherein the EPDCCH configuration further includes at least one of a system bandwidth or bandwidth, and the DCI format transmitted in the EPDCCH candidates.

3. The method according to claim 1, wherein the EPDCCH configuration is configured to use only an aggregation level candidate of a predetermined level or more for the EPDCCH candidates.

4. The method according to claim 1, wherein the uplink cell bandwidth indicates one of an uplink cell associated with a downlink cell or an uplink cell for transmission of a response message to the EPDCCH.

5. The method according to claim 1, wherein the EPDCCH configuration is a setting associated with a reception of control information based on predetermined EPDCCH candidates for fallback until reconfiguration of the EPDCCH candidates is completed.

6. The method according to claim 1, wherein the EPDCCH configuration is configured in such a way that a number of PRB pairs included in first EPDCCH candidates for transmission of a distributed EPDCCH (D-EPDCCH) is greater or equal to a number of PRB pairs included in second EPDCCH candidates for transmission of a localized EPDCCH (L-EPDCCH).

7. The method according to claim 1, wherein the EPDCCH configuration is configured in such a way that an aggregation level of first EPDCCH candidates for transmission of a distributed EPDCCH (D-EPDCCH) is higher than an aggregation level of second EPDCCH candidates for transmission of a localized EPDCCH (L-EPDCCH).

8. A user equipment (UE) for receiving control information in a wireless communication system, the UE comprising:

a receiver; and a processor configured to:

control the receiver to receive, from a base station via higher layer signaling, an enhanced physical downlink control channel (EPDCCH) configuration including a transmission type associated with an EPDCCH, a ratio value of an uplink cell bandwidth and a downlink cell bandwidth and a number of physical resource block (PRB) pairs associated with the EPDCCH, wherein the transmission type associated with the EPDCCH indicates whether a distributed EPDCCH transmission or a localized EPDCCH transmission is used, and monitor EPDCCH candidates according to an aggregation level for monitoring the EPDCCH to receive the control information, wherein the aggregation level is determined based on a downlink control information (DCI) format and the number of PRB pairs associated with the EPDCCH according to the transmission type associated with the EPDCCH, and wherein the processor determines whether an aggregation level candidate configuration for a uplink data scheduling DCI format is applied as an aggregation level candidate configuration for a specific DCI format transmitted in a downlink cell by comparing a predefined threshold value with the ratio value of the uplink cell bandwidth and the downlink cell bandwidth.

* * * * *